(12) United States Patent
Toronjo et al.

(10) Patent No.: US 12,480,234 B2
(45) Date of Patent: Nov. 25, 2025

(54) METHOD OF FORMING AN UPPER FOR AN ARTICLE OF FOOTWEAR

(71) Applicant: Under Armour, Inc., Baltimore, MD (US)

(72) Inventors: Alan Toronjo, Portland, OR (US); Thomas White, Baltimore, MD (US); James Shih-Tien Huang, Taipei (TW)

(73) Assignee: Under Armour, Inc., Baltimore, MD (US)

( * ) Notice: Subject to any disclaimer, the term of this patent is extended or adjusted under 35 U.S.C. 154(b) by 0 days.

(21) Appl. No.: 17/740,890

(22) Filed: May 10, 2022

(65) Prior Publication Data

US 2022/0354207 A1    Nov. 10, 2022

Related U.S. Application Data

(60) Provisional application No. 63/186,402, filed on May 10, 2021.

(51) Int. Cl.
*D03D 11/00* (2006.01)
*A43B 1/05* (2022.01)
(Continued)

(52) U.S. Cl.
CPC ............... *D03D 11/00* (2013.01); *A43B 1/05* (2022.01); *A43B 23/024* (2013.01);
(Continued)

(58) Field of Classification Search
None
See application file for complete search history.

(56) References Cited

U.S. PATENT DOCUMENTS 2,357,164 A    8/1944   Berg
3,183,868 A    5/1965   Shotsky
(Continued)

FOREIGN PATENT DOCUMENTS

CN        106149150 B        6/2019
DE     102019201113 A1 *    7/2020    ............... A43B 1/04
(Continued)

OTHER PUBLICATIONS

Liu, Q. "Literature Review: Materials with Negative Poisson's Ratios and Potential Applications to Aerospace and Defence." Defense Science and Technology Organization. Aug. 2006. https://apps.dtic.mil/sti/tr/pdf/ADA460791.pdf (Year: 2006).*
(Continued)

*Primary Examiner* — Grace Huang
(74) *Attorney, Agent, or Firm* — Edell, Shapiro & Finnan, LLC

(57) ABSTRACT

A woven textile structure is formed by weaving a first woven layer including first yarns and weaving a second woven layer including first yarns, where the woven layers are arranged in a stacked manner and are separated from each other. During the weaving of the first and second woven layers, second yarns are inserted along an intermediate span in the weft direction of the woven textile structure, where the second yarns are elongated to an elongated length during the insertion in the weft direction. First yarns of the first woven layer are interlaced with first yarns of the second woven layer and a second yarn of the intermediate span at a plurality of interlacing locations along the woven textile structure so as to define stitches at each interlacing location, where each stitch joins the first woven layer with the second woven layer.

14 Claims, 13 Drawing Sheets

(51) Int. Cl.
*A43B 23/02* (2006.01)
*D03D 13/00* (2006.01)
*D03D 17/00* (2006.01)

(52) U.S. Cl.
CPC .......... *D03D 13/004* (2013.01); *D03D 17/00* (2013.01); *A43B 23/028* (2013.01); *D10B 2501/043* (2013.01)

(56) References Cited

U.S. PATENT DOCUMENTS

| | | | |
|---|---|---|---|
| 3,412,547 A * | 11/1968 | Martin | D02G 3/326 |
| | | | 57/239 |
| 3,813,698 A * | 6/1974 | Campbell, Sr. | A41F 9/02 |
| | | | 2/237 |
| 3,842,438 A * | 10/1974 | Campbell, Sr. | A41F 9/02 |
| | | | 2/237 |
| 4,048,399 A | 9/1977 | Terzaghi | |
| 4,055,699 A * | 10/1977 | Hsiung | A43B 17/003 |
| | | | 428/80 |
| 4,349,020 A | 9/1982 | Krikorian | |
| 4,720,415 A | 1/1988 | Vander Wielen et al. | |
| 4,761,324 A | 8/1988 | Rautenberg et al. | |
| 5,481,861 A * | 1/1996 | Frith | D02G 3/328 |
| | | | 57/288 |
| 5,698,321 A * | 12/1997 | Selivansky | D02G 3/328 |
| | | | 442/310 |
| 5,707,709 A | 1/1998 | Blake | |
| 5,882,769 A | 3/1999 | McCormack et al. | |
| 7,834,236 B2 | 11/2010 | Middlesworth et al. | |
| 8,252,705 B2 * | 8/2012 | King | E02D 17/202 |
| | | | 442/205 |
| 9,670,604 B2 * | 6/2017 | Tsai | D03D 1/00 |
| 9,789,644 B2 | 10/2017 | Iovu | |
| 9,903,054 B2 * | 2/2018 | Cross | A43B 13/14 |
| 10,342,289 B2 * | 7/2019 | Bell | A43B 23/027 |
| 10,415,160 B2 | 9/2019 | Chou | |
| 10,499,707 B2 * | 12/2019 | Hobson | A43B 23/0285 |
| 10,791,797 B2 * | 10/2020 | Neumann | A43B 23/0235 |
| 11,358,367 B2 | 6/2022 | Lee et al. | |
| 11,457,682 B2 | 10/2022 | Massey et al. | |
| 11,701,862 B2 | 7/2023 | Toronjo et al. | |
| 11,744,325 B2 | 9/2023 | Toronjo et al. | |
| 2006/0135024 A1 | 6/2006 | Thomas et al. | |
| 2007/0034277 A1 | 2/2007 | Takai | |
| 2014/0023829 A1 | 1/2014 | Broering et al. | |
| 2014/0101816 A1 | 4/2014 | Toronjo | |
| 2016/0206046 A1 | 7/2016 | Cross | |
| 2016/0281273 A1 | 9/2016 | Bell et al. | |
| 2017/0114481 A1 * | 4/2017 | Lobato | D03D 15/56 |
| 2018/0135213 A1 | 5/2018 | Bell et al. | |
| 2020/0196705 A1 | 6/2020 | Toronjo et al. | |
| 2020/0196707 A1 | 6/2020 | Toronjo et al. | |
| 2020/0199795 A1 | 6/2020 | Fang et al. | |
| 2020/0270778 A1 * | 8/2020 | Bogan | G06F 3/03545 |
| 2021/0114345 A1 | 4/2021 | Toronjo et al. | |

FOREIGN PATENT DOCUMENTS

| | | | |
|---|---|---|---|
| EP | 3040179 A3 | 10/2016 | |
| EP | 2839755 B1 | 3/2020 | |
| ES | 2265740 B1 | 2/2008 | |
| JP | 2002302845 A * | 10/2002 | |
| KR | 101020642 B1 | 3/2011 | |
| KR | 101113304 B1 * | 2/2012 | D03D 11/02 |
| WO | 2018089900 A1 | 5/2018 | |

OTHER PUBLICATIONS

International Search Report and Written Opinion in counterpart International Application No. PCT/US2022/028526, mailed Aug. 9, 2022, 17 pages.

* cited by examiner

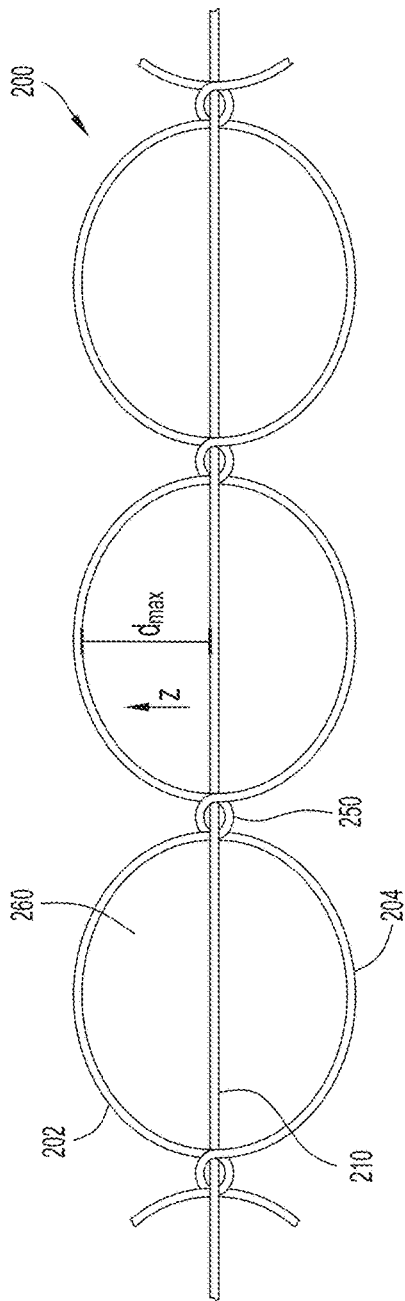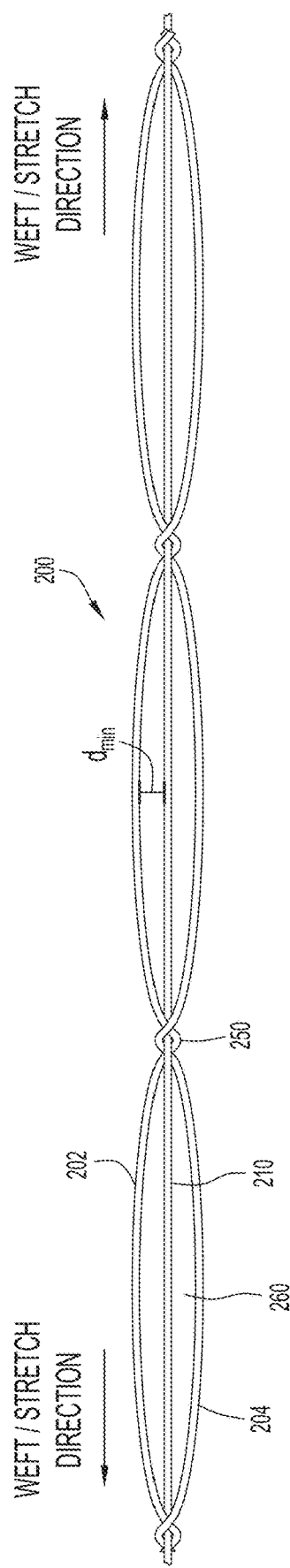
FIG.6A
FIG.6B

METHOD OF FORMING AN UPPER FOR AN ARTICLE OF FOOTWEAR

CROSS-REFERENCE TO RELATED APPLICATIONS

This application claims priority from U.S. Provisional Patent Application No. 63/186,402, filed May 10, 2021, and entitled "Woven Upper For An Article of Footwear," the entire disclosure of which is incorporated herein by reference.

FIELD OF THE INVENTION

The present invention relates to a method of forming an article of apparel, such as an upper for an article of footwear.

BACKGROUND

Apparel such an article of footwear can be designed to provide a variety of features in the upper and sole structure depending upon a particular application. Some features that are desirable are comfort, breathability, durability, stretchability and sufficient support and protection for the user's foot when the shoe is worn for a particular application. For certain applications, it may also be desirable to control a degree of stretch in one or more directions along the upper during use. Controlling a degree of stretch and providing a comfortable fit is also important for other textile articles, including articles of apparel.

It would be desirable to provide a textile article that is lightweight, breathable, and durable, and further provides enhanced levels of stretchability at different locations of the textile article depending upon a particular application of use.

SUMMARY OF THE INVENTION

In example embodiments, a method of forming a textile structure for an article of apparel comprises mechanically manipulating a strand such as a yarn. In an embodiment, a woven textile structure is formed by weaving a first woven layer comprising first or primary yarns arranged in a warp direction and a weft direction of the woven textile structure. During the weaving of the first woven layer, also weaving a second woven layer comprising first or primary yarns arranged in the warp direction and the weft direction of the woven textile structure, where the first and second woven layers are arranged in a stacked manner and are separated from each other. During the weaving of the first and second woven layers, a plurality of resilient, second or spanning yarns are inserted along an intermediate span in the weft direction of the woven textile structure, where the second yarns have a degree of elongation that is greater than the first yarns, the intermediate span is located in between the first and second woven layers, and the second yarns are elongated to an elongated length during the insertion in the weft direction. The method further includes interlacing first yarns of the first woven layer with first yarns of the second woven layer and also with one or more second yarns of the intermediate span at a plurality of interlacing locations along the woven textile structure so as to define stitches at each interlacing location, where each stitch joins the first woven layer with the second woven layer. Each second yarn contracts from the elongated length to a relaxed length after insertion in the weft direction and interlacing with first yarns of the first and second woven layers.

In further example embodiments, a method of forming a woven textile structure comprises weaving a first woven layer comprising first yarns arranged in a warp direction and a weft direction of the woven textile structure, weaving a second woven layer comprising first yarns arranged in the warp direction and the weft direction of the woven textile structure, and combining a plurality of second yarns with first yarns of the first and second woven layers such that the second yarns are disposed between the first and second woven layers and form an intermediate span in the weft direction of the woven textile structure. The second yarns have a degree of elongation that is greater than the first yarns. The combining of the second yarns with the first yarns forms a network of enclosed cells along the woven textile structure, where each cell comprises a first portion of the first woven layer that is buckled away from the intermediate span and a second portion of the second woven layer that is buckled away from the intermediate span and in an opposing direction from the first portion.

A woven textile structure is formed via the methods described herein. In addition, articles of apparel and/or accessories with pockets are formed using the woven textile structure as described herein.

In a still further example embodiment, an article of footwear comprises a sole structure, and an upper coupled to the sole structure. The upper comprises a dynamic textile structure capable of expansion and contraction, the textile structure including a first textile layer, a second textile layer, and a support framework comprising a plurality of anchor strands possessing stretch and recovery, where each of the first textile layer and the second textile layer is coupled to an anchor strand of the plurality of anchor strands at an anchor point.

The above and still further features and advantages of the present invention will become apparent upon consideration of the following detailed description of specific embodiments thereof.

BRIEF DESCRIPTION OF THE DRAWINGS

FIG. 6A is a cross sectional view of the woven textile material in a normal, unloaded or unstretched configuration.

FIG. 6B illustrates the woven textile material under a maximum degree of tension or load, causing lockout.

Like reference numerals have been used to identify like elements throughout this disclosure.

DETAILED DESCRIPTION

Figure 1A:
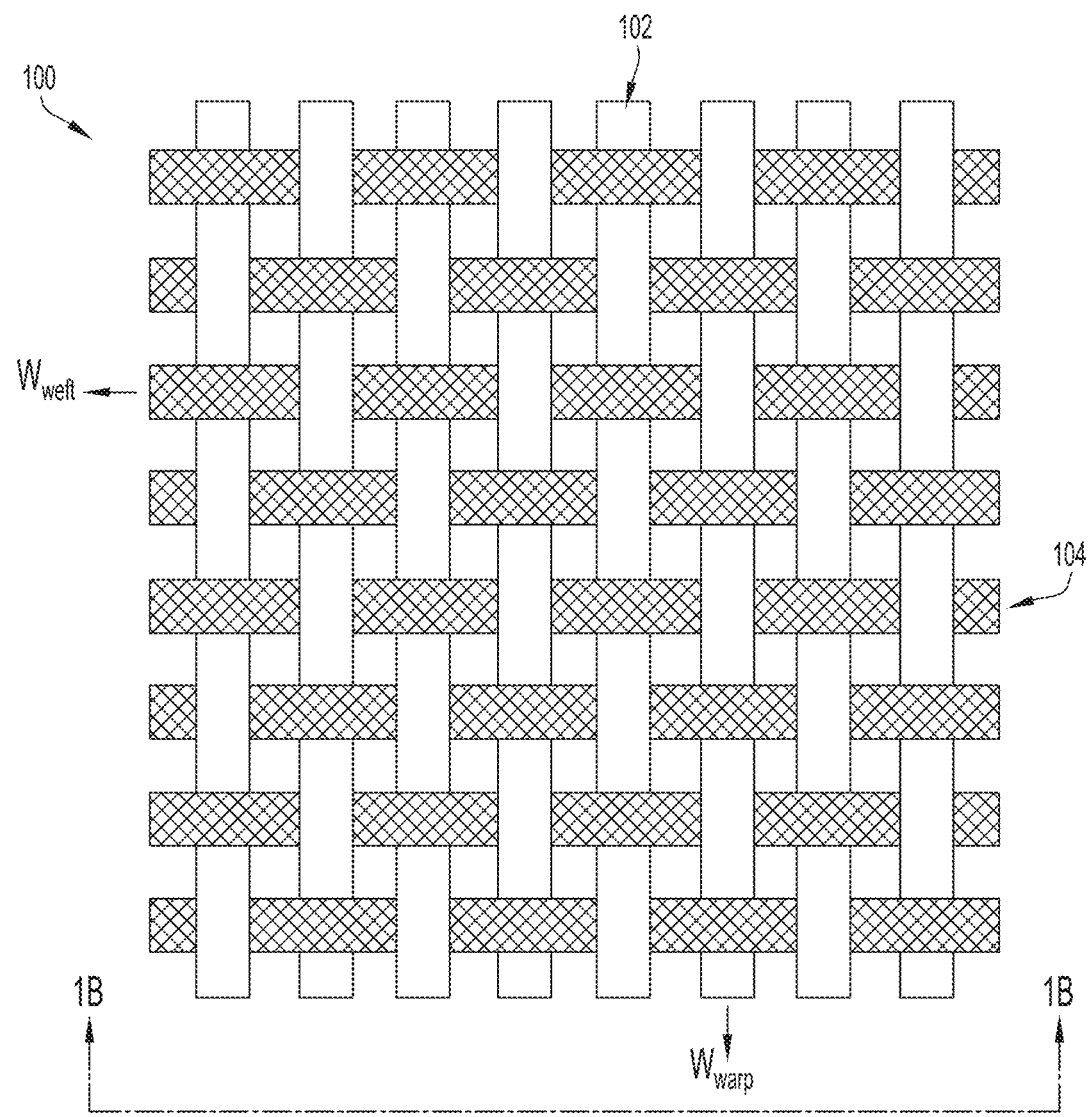
FIG. 1A is a schematic view of an example embodiment of a woven textile structure.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

A dynamic textile as described herein is a textile construction including a plurality of layers interlaced or interconnected such that the textile defines or a plurality of discrete, dynamic cells operable to influence the expansion and/or recovery of the textile. The textile material is resilient such that, when a load or tension is applied to the textile, the textile moves from a normal, unstretched configuration to an expanded, stretched configuration. The cells, moreover, move from a protruded configuration to a flattened configuration. When the load is released, the textile (including the cells) recovers, returning to its normal configuration.

In an embodiment, the dynamic textile is formed utilizing any suitable weaving process that facilitates the formation of a plurality of layers that are interconnected with each other at discrete locations to form one or more enclosed cells.

Figure 1B:
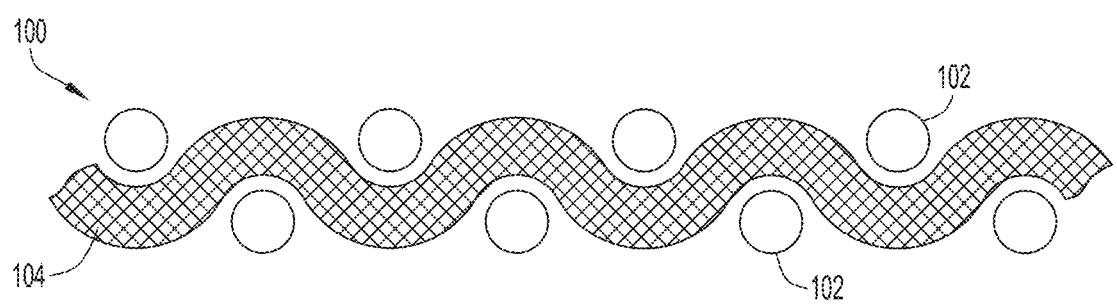
FIG. 1B is a view in cross-section of the woven textile structure of FIG. 1A taken along lines 1B-1B.

A general embodiment of a woven textile structure comprising a single layer is depicted in FIGS. 1A and 1B. In general, a weaving process comprise interlacing two or more yarns together so that the yarns cross each other at substantially right angles to produce a woven fabric. The warp yarns (ends) run lengthwise (longitudinally) in the fabric, while the weft yarns (filling threads or picks) run from side to side (transversely) in the fabric. The set of lengthwise yarns or threads (called the warp) are interlaced with a set of crossing threads (called the weft) via a loom. Several types of weaving patterns may be utilized to form the textile structure. In plain weaving, the warp and weft are aligned so they form a simple crisscross pattern, as shown for the woven textile structure 100 in FIGS. 1A and 1B. For example, each weft yarn 104 crosses the warp yarns 102, where each weft yarn 104 can alternately go over one warp yarn 102 and under the adjacent or successive warp yarn 102. The adjacent warp yarn inverts this process, with the warp yarn crossing under the weft yarn which is successive to the previous yarn crossed over. Other types of weaves are also known in the woven art. For example, a basket weave, similar to the plain weave, includes two or more warp and filling/weft yarns woven side by side to resemble a plaited basket. In a satin weave, the face of the fabric consists almost completely of warp or filling floats produced in the repeat of the weave. A twill weave is characterized by diagonal lines produced by a series of floats staggered in the warp direction. A double weave includes two systems of warp or filling yarns combined such that only one is visible on either side. A leno weave includes warp yarns arranged in pairs, with one warp yarn twisted around another warp yarn between picks of filling yarn. Further still, weaves can be formed in which a yarn (e.g., warp yarn) alternates crossing over or under the other yarns (e.g., weft yarns) in any selected number or grouping of yarns. For example, a woven textile can be formed in which a warp yarn crosses over some number (e.g., 2, 3, 4, . . . . N) of adjacent or successive weft yarns and then crosses under some number of adjacent or successive weft yarns.

Two or more woven layers can also be formed and interconnected or interlaced with each other during the weaving process. In other words, two or more layers can be simultaneously woven (e.g., a double weave for two layers) in a stacked or vertically oriented manner with each other using a loom or other weaving structure, with warp and weft yarns forming each individual layer, and further where the layers can be connected at intersection areas or intersection points in which one or more yarns from one layer interlace with one or more yarns from another layer. Each specific location or point along the woven textile structure at which interlacing of yarns between two or more layers occurs is referred to as a stitch. Any suitable process can be used to form the woven textile structure with a plurality of interconnected layers, with stitches forming stitch lines that define any number of different patterns along a surface of the woven textile structure. In an example embodiment, the woven textile structure embodiments described herein are formed using a Jacquard machine or Jacquard loom that implements a Jacquard weaving process.

Mechanical manipulation of yarns to form a fabric via a weaving process is distinguishable from mechanical manipulation of yarns via a knitting process. Knitting is a process for constructing fabric by interlocking a series of loops (bights) of one or more strands organized in wales and courses. In general, knitting includes warp knitting and weft knitting. In warp knitting, a plurality of strands runs lengthwise in the fabric to make all the loops. In weft knitting, one continuous strand runs crosswise in the fabric, making all of the loops in one course. Weft knitting includes fabrics formed on both circular knitting and flat knitting machines. With circular knitting machines, the fabric is produced in the form of a tube, with the strands running continuously around the fabric. With a flat knitting machine, the fabric is produced in flat form, the strands/loops alternating back and forth across the fabric. In an embodiment, the upper is formed via flat knitting utilizing stitches including, but not limited to, a plain stitch; a rib stitch, a purl stitch; a missed or float stitch (to produce a float of yarn on the fabric's wrong side); and a tuck stitch (to create an open space in the fabric). The resulting textile includes an interior side (the technical back) and an exterior side (the technical face), each layer being formed of the same or varying strands and/or stitches.

Figure 2A:
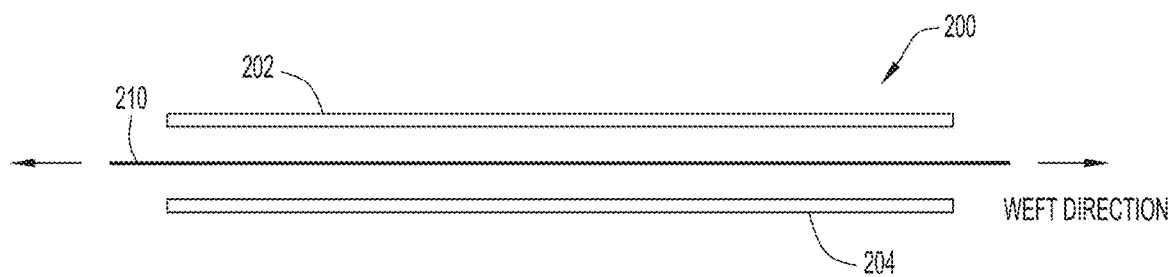
FIG. 2A is a schematic view generally showing the formation of the woven textile structure with the intermediate span of elastic second yarns stretching in the weft direction prior to connection with the first and second woven layers.
Figure 2B:
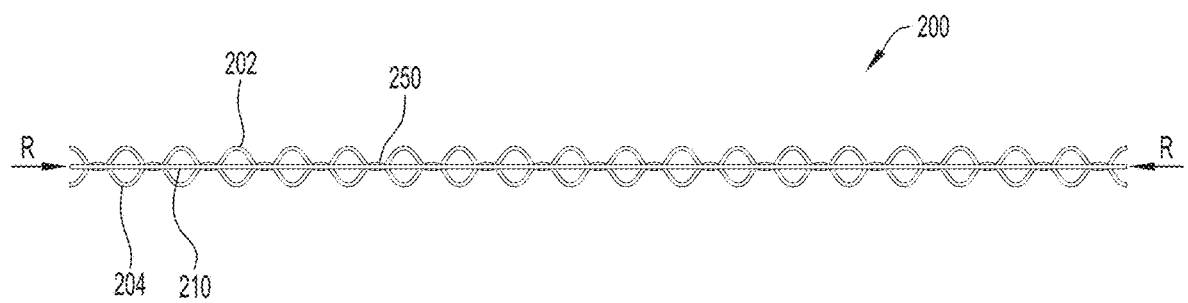
FIG. 2B is the schematic view of the woven textile structure of FIG. 2A, with the first and second woven layers interlaced with the elastic second yarns at stitch locations and further showing contraction and recovery of the elastic second yarns along the weft direction of the structure.

In the example embodiments described herein, a woven textile or fabric structure is formed using a weaving process (e.g., Jacquard weaving process) in which woven layers are interconnected with each other and with an intermediate framework or layer of elastic yarns via stitches organized to define a pattern of stitch lines within the woven layers. Referring to FIG. 2A, in an embodiment, a woven textile structure 200 is formed comprising a first woven layer (e.g., exterior layer) 202 and a second woven layer (e.g., interior layer) 204 arranged in a stacked manner in relation to each other. Each woven layer 202, 204 includes primary yarns (also called first yarns) extending in the warp and weft directions of the woven textile structure 200 (i.e., each woven layer 202, 204 includes yarns arranged in warp and weft directions as shown in FIG. 1A, where the view in FIG. 2A is along the weft direction). A plurality of resilient, spaced-apart, spanning yarns (also called second yarns) extend along the fabric in the weft direction (e.g., from fabric edge to opposite fabric edge). The spanning yarns 212A, 212B, 212C are positioned between the first layer 202 and the second layer 204 such that each spanning yarn is oriented generally horizontally from fabric edge to fabric edge. In this manner, the spanning yarns 212A, 212B, 212C effectively define a spanning layer 210 (the spanning yarns being generally located along a common plane) disposed intermediate/between the first and second woven layers. The spanning yarns 212A, 212B, 212C possess a degree of stretch or elongation greater than (e.g., significantly greater than) in relation to the first yarns in the first and second woven layers. At least some of the first yarns of the first and second woven layers are interlaced with second yarns of the intermediate layer or span at the locations defined as stitches. Further, stitches are formed as lines along the surfaces of the first and second woven layers, where the stitch lines form patterns of enclosed boundaries or cells having certain physical features as described herein.

The primary or first yarns used to form the woven layers and intermediate span or layer can be formed from a single fiber or filament or any number of fibers or filaments twisted together or combined in any other suitable manner. For example, a yarn may include a number of filaments or fibers twisted together (spun yarn); a number of filaments or fibers laid together without twist (a zero-twist yarn); a number of filaments or fibers laid together with a degree of twist; and a single filament fiber with or without twist (a monofilament).

The primary or first yarns used to form the first and second woven layers can be formed from filaments or fibers comprising any one or more suitable materials including, without limitation, cellulosic fibers (e.g., cotton, bamboo) and protein fibers (e.g., wool, silk, and soybean), polyolefin fibers (e.g., polyethylene, polypropylene, etc.), polyester fibers (e.g., polyethylene terephthalate or PET fibers and poly(trimethylene terephthalate) fibers), polycaprolactam fibers, poly(hexamethylene adipamide) fibers, acrylic fibers, acetate fibers, rayon fibers, polyamide (nylon) fibers, aramid fibers (e.g., Kevlar fibers) and any selected combinations thereof. The first yarns can be inelastic yarns (e.g., having no inherent stretch and/or recovery properties by virtue of composition). Alternatively, the first yarns can have some degree of stretch or elongation, albeit having a degree of elongation that is significantly less than the degree of elongation of the elastic second yarns. The first yarns can be the same or different for each of the first and second woven layers. In addition, the first yarns of the first woven layer can be the same as or different from the first yarns of the second woven layer. In example embodiments described herein, each of the first and second woven layers include first yarns comprising polyester or Kevlar fibers, where the first yarns have very little or no stretch/elongation properties. Accordingly, the first and second woven layers, when isolated (i.e., not interlaced/integrated with each other and with the span of elastic second yarns) can be generally rigid (having little or no stretch). Alternatively, the first and second woven layers can have moderate stretch (e.g., less than 25%-50% elongation) in isolation (i.e., free portions of each woven layer). The first and second woven layers can also have different degrees of elongation in relation to each other (while both are still not as stretchable, or have degrees of elongation, that are less than the intermediate span of elastic second yarns).

The spanning or second yarns 212A, 212B, 212C used to form the anchor layer or span 210 can comprise elastic filaments or fibers including elastomeric material (e.g., 100% elastic material). Elastic filaments or fibers, by virtue of their composition alone, are capable of stretching under stress and recovering to original size once the stress is released. Accordingly, elastic filaments or fibers provide the elastic second yarns with stretch properties and also provide the formed woven textile structure with certain stretch properties as described herein. An elastic filament or fiber can be formed of rubber or a synthetic polymer having properties similar to that of rubber. A specific example of an elastomeric material suitable for forming an elastic filament or fiber is elastane, which comprises an elastomeric polyester-polyurethane copolymer (e.g., Spandex). In a further specific example, an elastic second yarn can comprise one or more elastane fibers with one or more polyester and/or nylon fibers wrapped or coiled around the one or more elastane fibers. In a further embodiment, the spanning yarn may be a thermoplastic polyester monofilament yarn, which is resilient and recyclable. It possesses good elongation (65%-100%), strong recovery (about 90% at 100 cycles and about 85% at 500 cycles) and may be produced in deniers of about 90d to about 2200d/f. (TOLILON® monofilament, available from RI-THAI INTERNATIONAL, INC., Taipei, TW). As previously noted, the second yarns have a degree of stretch or elongation that is significantly greater than a degree of stretch or elongation for the first yarns.

Elongation of the first or second yarns can be measured in units of length (e.g., millimeters, inches) or calculated as a percentage of the original length (e.g., a yarn that stretches 100% expands to twice its original length). In particular, an elongation value (also referred to as a stretch value) refers to an amount of elongation of a yarn or material in a dimension (length or width) that is defined with the formula: [(elongated dimension-original dimension)/(original dimension)]× 100. Recovery (elastic recovery or elasticity) is the ability of a yarn or material under load to recover its original size or near original size and shape immediately after removal of the stress that causes deformation. For example, a recovery percentage refers to a percentage of an original dimension to which the yarn or material relaxes (i.e., no longer under the load or tension) after being stretched along such dimension (e.g., a recovery percentage of at least 90% of a yarn or material indicates that the dimension of the yarn or material in the stretch direction after the load is removed will not differ from the original dimension of the yarn or material before being stretched by more than 10%). As further described herein, the span or layer of elastic second yarns impart a stretch or elongation to the woven textile structure.

Figure 2C:
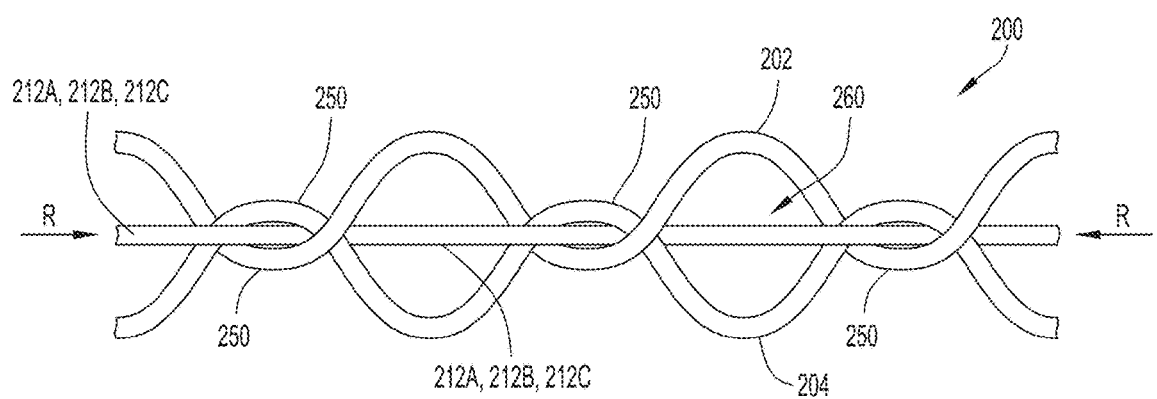
FIG. 2C is an enlarged image of a portion of the woven textile structure depicted in FIG. 2B.
Figure 2D:
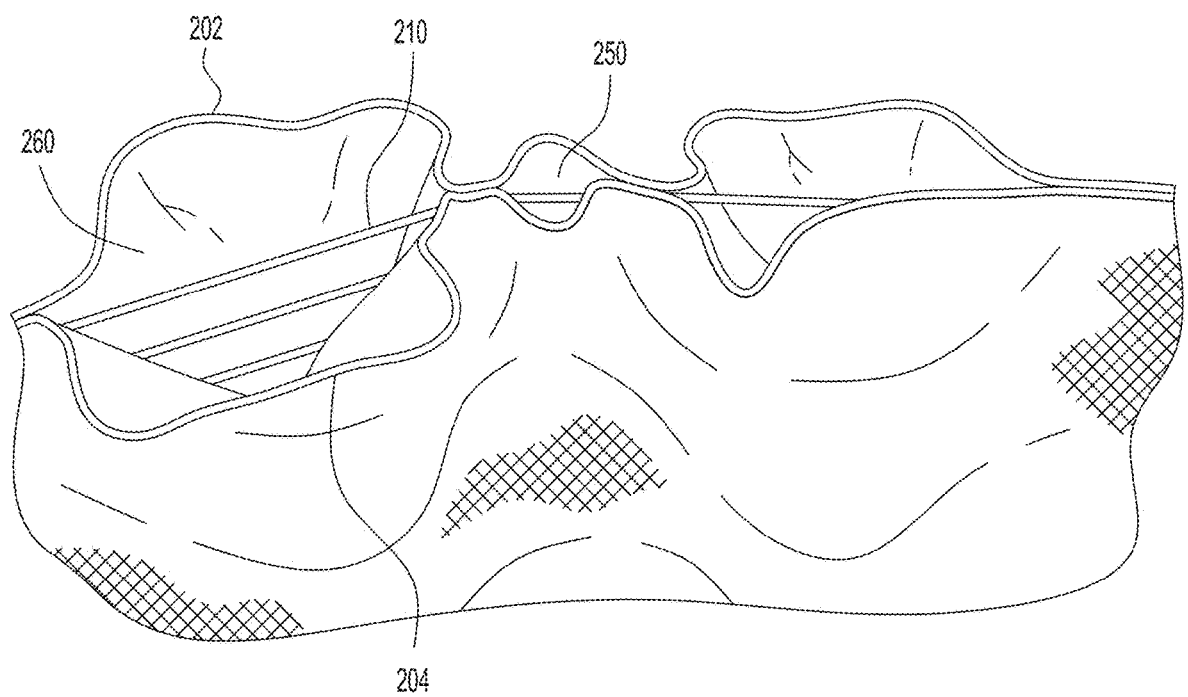
FIG. 2D is a cross-sectional view in perspective of a portion of a woven textile similar to that depicted in FIG. 2C.
Figure 3:
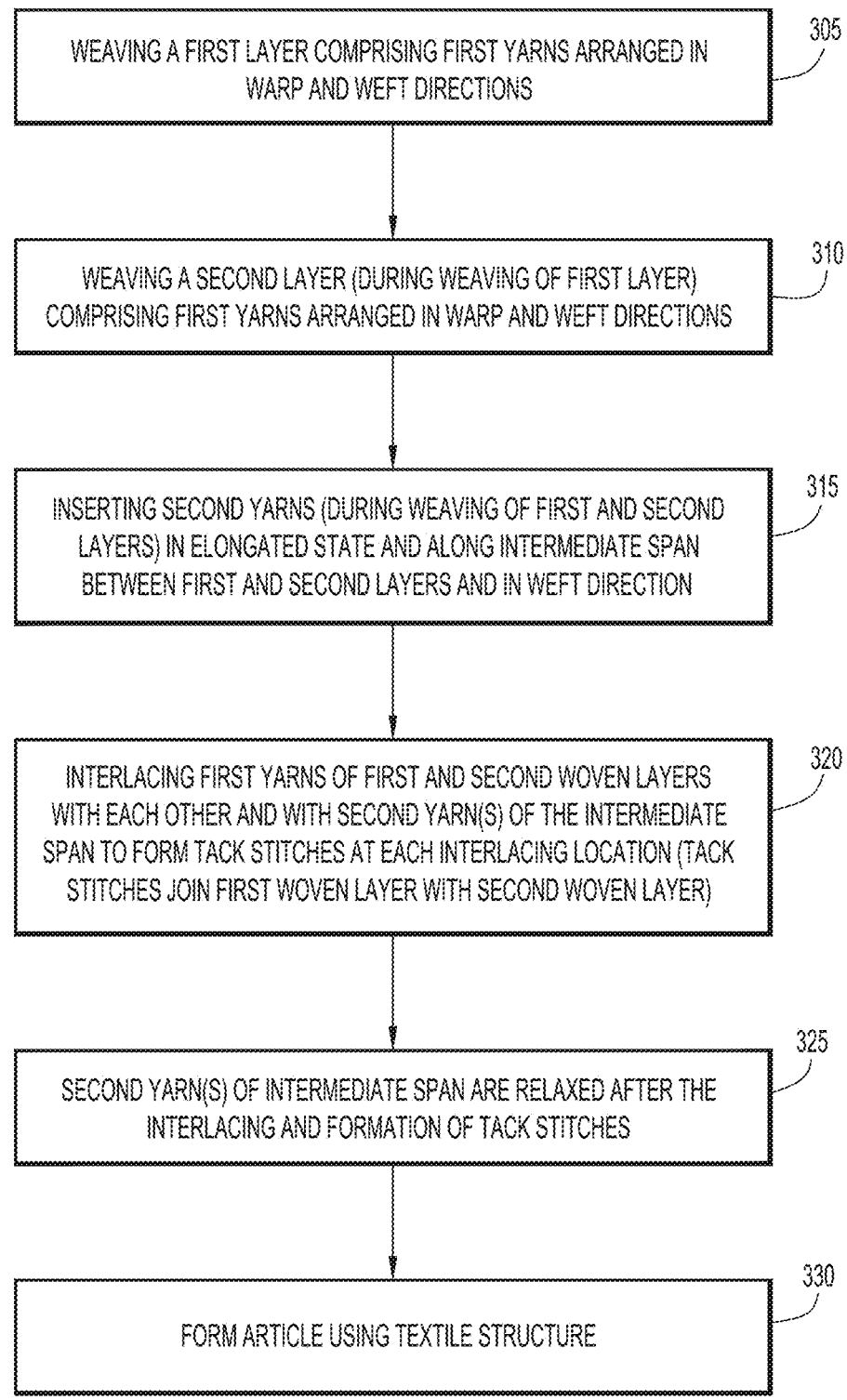
FIG. 3 is a flowchart describing an example embodiment of a method of forming a woven textile structure such as that depicted in FIGS. 2A-2D.

An example embodiment schematically depicting the formation of a woven textile structure is depicted in FIGS. 2A-2D, with example method steps set forth in the flowchart of FIG. 3. The woven textile structure can be used to form an article of apparel, an accessory such as an accessory with a pocket (e.g., a backpack or a carrier bag with a handle such as a purse or duffle bag) and/or any other suitable article that incorporates the structure.

In the method, at 305, a first woven layer is formed by a weaving process comprising first yarns arranged in a warp direction and a weft direction of the woven textile structure. At 310, and during the weaving of the first woven layer, a second woven layer is formed by a weaving process comprising first yarns arranged in the warp direction and the weft direction of the woven textile structure. The first and second woven layers can be arranged in a stacked manner and are separated from each other.

For example, during the weaving process (e.g., utilizing a Jacquard weaving process) to form the woven textile structure 200, a first woven layer 202 and a second woven layer 204 can be simultaneously formed (e.g., a double weave) using the same loom or weaving machine and where each layer includes warp and weft yarns (e.g., each layer can have a configuration as shown in the embodiment in FIG. 1A). The warp and weft yarns forming the first and second woven layers are first yarns that are inelastic (or are less elastic/have a lower degree of stretch or elongation in relation to the second yarns that form the intermediate layer as described herein). As further shown in the embodiment, the woven layers are formed in a stacked or vertically oriented relationship with each other, with the first woven layer 202 being formed over the second woven layer 204. This can result in a woven textile structure in which, e.g., an exposed surface of the first woven layer 202 forms or faces toward an exterior surface of a fabric product and an exposed surface of the second woven layer 204 forms or faces toward an interior surface of the fabric product.

At 315, and during the weaving of the first and second woven layers, a plurality of second yarns are inserted along an intermediate span in the weft direction of the woven textile structure. The second yarns have a degree of elongation that is greater than the first yarns, and the intermediate span is located in between the first and second woven layers. The second yarns are further elongated to an elongated length during the insertion in the weft direction.

For example, simultaneously with the formation of the first and second woven layers, an intermediate layer or span 210 of elastic second yarns is formed (e.g., simultaneously or continuously with the formation of the first and second woven layers and on the same loom or weaving machine) between the first and second woven layers during the weaving process. The span 210 of second yarns runs only in the weft direction of the woven textile structure 200 being formed (i.e., in the same direction as the first yarns extending in the weft direction and forming the first and second woven layers). As described herein, the span 210 of second yarns running only in the weft direction includes second yarns that are spaced from each other at a greater distance than weft first yarns for each of the first and second woven layers (i.e., the span includes fewer second yarns than first yarns oriented in the weft direction for each of the first and second woven layers).

When elastic second yarns 212A, 212B, 212C forming the intermediate layer or span 210 between the first woven layer 202 and second woven layer 204 are inserted in the weft direction during formation of the woven textile structure 200, the elastic second yarns of the span 210 are pulled by the loom or weaving machine and thus stretched in the weft direction (as shown by the arrows in FIG. 2A) as they are delivered from the loom or weaving machine between the first and second woven layers.

At 320, first yarns of the first woven layer are interlaced with first yarns of the second woven layer and also with one or more second yarns of the intermediate span at a plurality of interlacing locations along the woven textile structure so as to define stitches at each interlacing location, where each stitch joins the first woven layer with the second woven layer.

For example, the weaving process interlaces the first yarns of the first and second woven layers 202, 204 as well as second yarns 212A, 212B, 212C of the span 210 at predefined intervals and predefined locations 250 (FIGS. 2B and 2C) along the woven textile structure, also referred to herein as stitch locations or stitches 250 (e.g., tack stitches). The stitches 250 provide locking or anchor points between first yarns of the first and second woven layers 202, 204 and elastic second yarns of the span 210, where movement of the first woven layer, second woven layer and span is prevented relative to each other at the stitch locations due to the yarns being interlaced and locked together at such stitch locations. Accordingly, at stitch locations, each the first woven layer (e.g., warp and/or weft yarns from the first woven layer), the second woven layer (e.g., warp and/or weft yarns from the second woven layer) and a spanning yarn 212A, 212B, 212C of the span 210 are interlocked such that the spanning yarn anchors the first and second woven layers at stitch location 250. In comparison, at other surface area locations separate from the stitches 250, the first woven layer 202 and the second woven layer 204, as well as the span 210 of elastic second yarns, are separated and unattached from each other.

Some or all of the yarns of the first and second woven layers (including warp yarns and weft yarns) located at the area defined by each stitch location as well as one or more elastic second yarns of the span 210 extending in the weft direction at such stitch location can be interlaced with each other to form each stitch 250. In particular, at least one second yarn from the span 210 interlaces with first yarns of the first and second woven layers 202, 204 at each stitch 250. In a specific example embodiment, a single second yarn interlocks with a plurality of first yarns from the first and second woven layers at each stitch location.

At 325, and after the first woven layer 202 and the second woven layer 204 are joined together via stitches, tension is removed, permitting each second yarn 212A, 212B, 212C of the intermediate span to recover, causing the span 210 to contract from the elongated length to a relaxed length.

For example, during the weaving process, after insertion of each second yarn of the span 210 along the weft direction such that the weft yarn is integrated as part of the woven textile structure and no longer pulled by the loom or weaving machine, the second yarns relax and recover to a certain degree within the structure along the weft direction (as shown by the arrows R in FIGS. 2B and 2C), which imparts a contraction of textile structure. The combination of relaxation and recovery/contraction and the formed stitches 250 results in a buckling or bowing of portions of each of the first and second woven layers 202, 204 away from each other between the stitches (i.e., between the anchor point locations at which yarns of the layers 202, 204 and span 210 are interlaced and locked with each other).

As shown, e.g., in the enlarged view of FIG. 2C (and also the photographic image of FIG. 2D), the interlacing between first yarns of the first and second woven layers and the second yarns of the weft span is configured (e.g., based upon operation of the loom or weaving machine) such that first yarns of the first and second woven layers only slightly traverse from one side (e.g., top or exterior side) to another side (e.g., bottom or interior side) of the woven textile structure at the stitch locations. Accordingly, the first and second woven layers continue to extend along the same respective sides of the woven textile structure. However, in other embodiments, the interlacing can be configured (e.g., by adjusting the loom or weaving machine) such that first yarns of the first and second woven layers alternate or change sides at one or more stitch locations as these layers extend along the woven textile structure.

At 330, the woven structure can be used to form a product or article, such as an article of apparel (e.g., footwear or clothing), an accessory with a pocket (e.g., a backpack or a purse). Examples of articles in which the woven structure can be implemented for use are described in further detail herein and with reference to FIGS. 7-10.

The stitches 250 are arranged to influence the expansion and recovery pattern of the woven textile 200. In an embodiment, the stitches are positioned within the woven textile 200 so as to form an array of pockets or cells 260. As illustrated, the cells 260 may be enclosed cells, possessing enclosed boundaries with each cell bordered on all sides by stitches. Accordingly, each cell 260 (as shown in FIG. 2C) comprises a portion of the first woven layer 202 disposed between the stitches 250 defining the cell perimeter or boundary, a portion of the second woven layer 204 disposed between the cell perimeter of stitches 250, and a portion of the spanning yarn 212A, 212B, 212C comprising one or more elastic second yarns also disposed between the cell perimeter of stitches. For each cell 260, each portion of the first and second woven layers and the span of second yarns is anchored or locked with the other portions at the cell perimeter.

Figure 4A:
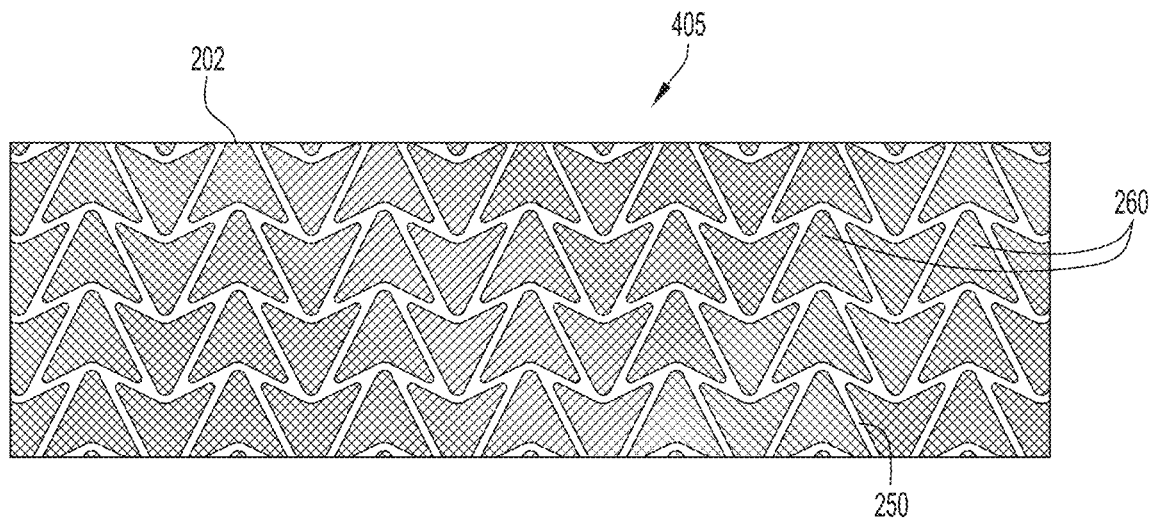
FIG. 4A is view depicting an example embodiment of an auxetic "arrowhead" shaped pattern of shapes formed by stitch lines along a surface of the first woven layer.
Figure 4B:
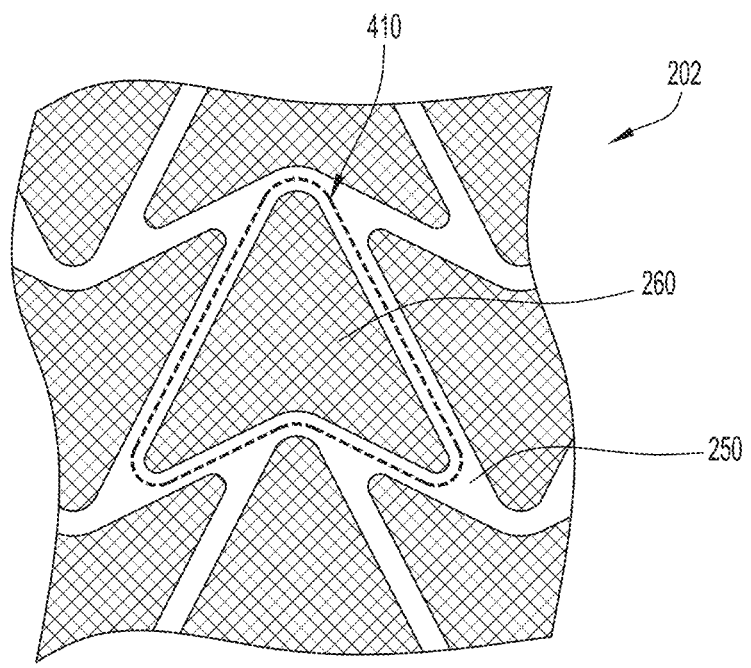
FIG. 4B is an enlarged view of a portion of the surface of the first woven layer for the structure of FIG. 4A.

An example embodiment of stitch lines organized or selected to form patterns of enclosed pockets or cells in a woven textile structure is depicted in FIGS. 4A and 4B, where the woven textile structure 200 includes a stitch network or pattern 405 forming an array of individual or discrete pockets or cells 260 within the woven textile 200 such that the stitches (and as such, the cell array) is visible along the surface of the first woven layer 202 and the surface of the second woven layer 204. The view of FIG. 4A shows how the stitches 250 at the exterior surface of first woven layer 202 correspond with the locations at which interlacing occurs between yarns of the first layer 202, second layer 204 and span 210 of second yarns. Each cell 260 of the stitch network 405 has predetermined dimensions (size and shape) and is formed by an enclosed area, which, in turn, is defined by a stitch perimeter or border 410 of stitch lines (i.e., a pattern of straight and/or curved lines or rows formed from a plurality of stitches) for the cell. In the embodiment of FIGS. 4A and 4B, the network of stitches 250 includes an array of polygonal, arrow-shaped or arrowhead cells 260 defined within the perimeter or boundary of the stitch lines. The cells 260 have uniform size and shape, with the cells further being organized in columns and rows. As shown, the arrowhead cells 260 of one column are inverted compared to the arrowhead cells 260 of an adjacent column. As depicted in these figures, the arrowhead shape for each cell is oriented with the arrowhead point directed in the warp direction of the woven textile structure (i.e., in a direction transverse or perpendicular to the direction of the span 210 of second yarns, which is the weft direction of the woven structure). In further embodiments, the cells can have varying sizes and/or varying shapes.

As described in more detail herein, the elastic second yarns 212A, 212B, 212C of the weft span 210 facilitate a stretching or elongation of the woven textile structure 200 in at least the weft direction, which results in a collapse of the cells 260 (i.e., portions of the first woven layer 202 and second woven layer 204 within each cell collapsing in a direction toward each other) during this expansion. When the stretching is released, the second yarns 212A, 212B, 212C recover, resulting in expansion of the cells 260 (i.e., movement or buckling of the portions of the first woven layer 202 and the second woven layer 204 with each cell away from each other) to their relaxed positions.

The number of elastic second yarns running along the weft span 210 between the first 202 and second woven layers 204 can be adjusted to obtain a selected degree of stretch and recovery for the woven textile structure 200 in the warp and/or weft direction(s) during use as well as a degree of buckling and size or voids formed within the cells 260 when the woven textile structure is formed. In particular, the number of elastic second yarns running in the weft direction of the textile structure and forming the intermediate layer or span 210 can be less than the number of first yarns running in the weft direction for each of the first woven layer 202 and the second woven layer 204. Accordingly, the total number of elastic second yarns can be significantly less than the total number of first yarns for the first and second woven layers. In example embodiments, the yarn or fiber content of the woven textile structure can comprise about 5% to about 10% elastic second yarns and about 90% to about 95% first yarns. In a specific example, a woven textile 200 structure can be formed with a fiber content of about 92% polyester fibers (forming the first yarns) and about 8% elastane fibers (forming the second yarns).

The dimensions and shapes of the cells 260 formed by the stitch boundary lines can also be selected to enhance the abilities of the woven textile structure to stretch in the warp and/or weft direction(s) during use.

For example, the shapes and/or configuration of the cells (as defined by the stitch line patterns/stitch network applied along the surface areas of the woven layers) may be selected to create a pattern effective to affect the expansion and or recovery pattern of the textile. In an embodiment, the pattern is effective to change (e.g., lower) the Poisson's ratio of the woven textile structure compared to the ratio the woven textile structure would have without the pattern.

In a further embodiment, the stitching that forms the cells 260 (e.g., cells of stitch network 405 as shown in FIGS. 4A and 4B) may be selected to provide the woven textile structure 200 with a negative Poisson's ratio. In other words, when stretched, the woven textile structure and/or cells of the woven textile structure will move or expand in a direction generally orthogonal or perpendicular to the applied tension or stretching force. This will also cause a change in the shapes of the cells, where the cells collapse along the z-axis in response to such tension or stretching force along X and/or Y axes as described herein (in relation to FIGS. 6A and 6B).

Lowering or imparting a negative Poisson's ratio to the woven textile structure can be achieved by providing a stitch network 405 that forms cells 260 having one or more auxetic shapes (e.g., the auxetic arrowhead shapes of cells 410 for stitch network 405). Further still, the auxetic shapes can be formed as reentrant polygonal shapes. A reentrant polygonal shape has one or more reentrant angles, where a reentrant angle is an internal angle of the polygon that is greater than 180°. Reentrant auxetic shapes can have hinge-like features (e.g., at the reentrant angle locations of the auxetic shapes) that can cause an expansion or compression of the woven textile material or woven layer upon which the auxetic shape is formed in a direction orthogonal or perpendicular to a direction of corresponding expansion or compression of the woven textile structure. In the embodiments described herein, hinge-like features are formed by the stitch network defining the cells 260, including the stitches 250 (forming anchor points for the yarns of the first and second woven layers and the intermediate span).

Figure 5A:
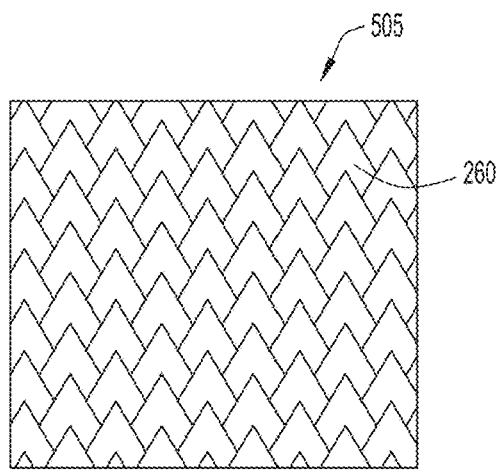
FIGS. 5A, 5B, 5C, 5D and 5E depict schematic views of stitch patterns for a woven textile material according to embodiments of the invention.
Figure 5B:
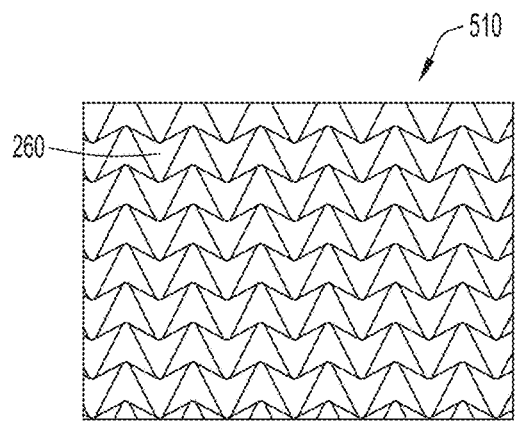
Figure 5C:
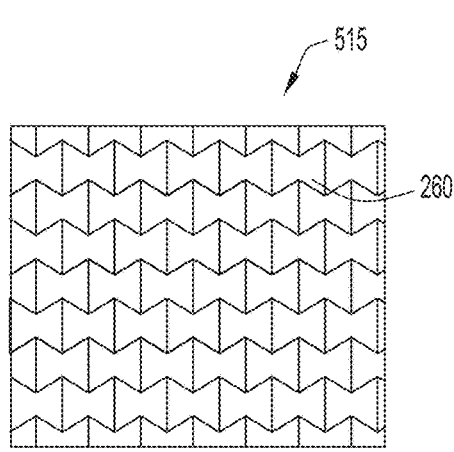
Figure 5D:
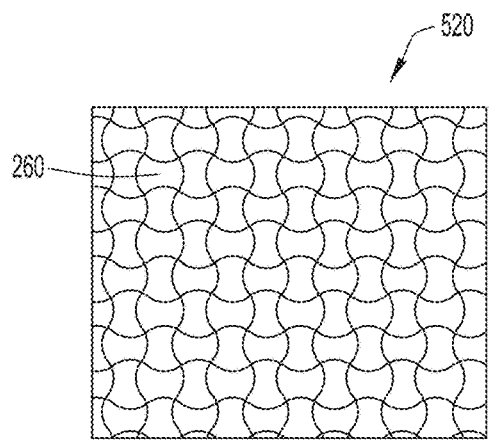
Figure 5E:
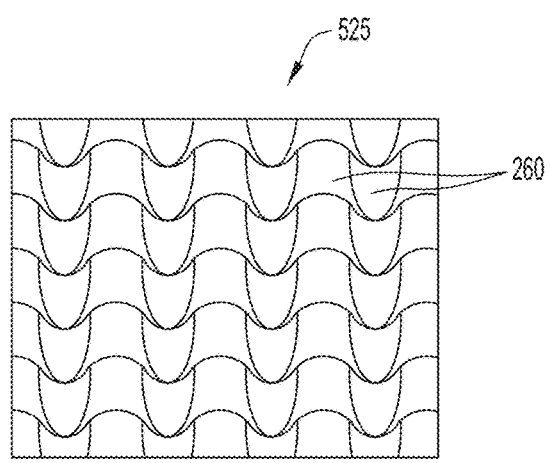

Any suitable type or types of auxetic patterns can be formed by the patterned stitch network 405 along the exposed sides or surfaces of the first 202 and second 204 woven layers. Some non-limiting examples of cell arrays formed as auxetic patterns which can be used to form cells 260 of a woven textile structure are depicted in FIGS. 5A-5E. Referring to FIGS. 5A and 5B, stitch networks 505, 510 are shown along a surface of one of the woven layers (e.g., first woven layer) forming cells having an arrowhead auxetic shape that is similar in shape and pattern configuration as the tack stitch network 405 of cells 410 depicted in FIG. 4A. Other examples of auxetic cell shapes that can be provided for a woven textile structure are shown by the stitch patterns 515, 520, 525 in FIGS. 5C, 5D and 5E (e.g., hourglass shaped auxetic cells for stitch patterns 515, 520, and wavy shaped auxetic cells for stitch pattern 525). Each of the auxetic cell shapes depicted in the patterns FIGS. 5A-5E include a reentrant angle. The auxetic cell shapes can further be formed in the woven textile structure such that the reentrant angles of the cell shapes are aligned or point in a direction along the woven textile structure that is transverse a dominant stretch direction (i.e., weft direction or direction of the intermediate layer span 210) of the woven textile structure. The term "dominant stretch direction", as used herein, refers to a direction along the woven textile structure having the greatest degree of elongation.

It should be understood, however, that other enclosed cell shapes may be utilized in forming the stitch network for a woven textile structure. For example, non-auxetic polygonal cells may be utilized.

The woven textile structure 200 including stitch networks 405 of enclosed cells 260 can be incorporated into any article of apparel or any other fabric product. When incorporated into a fabric product, the woven textile structure imparts features which enhance the stretchability of the fabric product. In particular, a woven textile structure formed as described herein provides a dynamic textile that repeatedly stretches under load and recovers upon removal of the load. The stretch properties of the elastic second yarns of the intermediate span 210 allow for a certain amount of overall stretch for the woven textile structure under load and, upon removal of the load, further drives the entire woven textile structure (including first and second woven layers) back to its normal, unstretched state.

Referring to FIGS. 6A and 6B, the woven textile structure 200 begins in its normal, unstretched configuration. The distance ($d_{max}$) between the intermediate span 210 of second yarns and the highest point of the protruding cell (i.e., the apex of the curved or convex portions of the first woven layer 202 or the second woven layer 204) is at its maximum value. In addition, a void exists between the first woven layer and second woven layer that defines a void volume within each cell 260, and the void volume is at its maximum in the normal, unstretched configuration of the woven textile structure.

Applying a tension or load along the weft direction (i.e., a dominant stretch direction) of the woven textile structure 200 causes stretching of the second yarns of the intermediate span 210 in the directions indicated by the arrows (weft direction of the structure). This results in a corresponding splaying or collapse of the cells 260 in a direction along a Z axis (orientation of axis indicated by arrow z) toward the intermediate span 210 of second yarns. As the cells 260 collapse or flatten, the distance between the highest point of the cell 260 ($d_{max}$) decreases, as does the void volume of the cells 260 (i.e., going from the configuration of FIG. 6A to the configuration of FIG. 6B). Continued application of tension or load stretches the woven textile structure until full or complete collapse and flattening of the cells 260 is achieved (as depicted in FIG. 6B). At this degree of tension, the distance ($d_{min}$) between the intermediate span 210 of second yarns and the highest point of the protruding cell is at a minimum, with the woven layers 202, 204 coming so close to each other to contact or nearly contact each other and the second yarns of the span 210 (also resulting in the void volume of each cell 260 being at a minimum).

The collapse or flattening of the cells 260 during stretching of the second yarns in the intermediate span 210 enhances stretching of the woven textile structure during cell collapse until the cells lock down or lock out (e.g., completely flatten, FIG. 6B) so as to prevent further expansion of the woven textile structure in the area of the flattened cells. This becomes a lock down or a lock out position or static state at which the woven textile structure is prevented from further movement. Upon release of the tension on the woven textile structure 200, the structure contracts back to its relaxed (e.g., original) dimension and the woven layer portions of the cells 260 buckle outward and away from each other to their original positions as depicted in FIG. 6A. The cells 260 therefore exhibit a dynamic or loaded state in which the cells are capable of movement along the z-axis and a degree of stretching movement of the woven textile structure, and the cells 260 further exhibit a static state (FIG. 6B) when the woven layer portions of the cells are fully flattened or collapsed toward each other so as to lock the portion of the woven textile structure including the fully flattened cells in place and prevent further stretching movement of this portion of the structure.

The woven textile structure can be formed so as to have a selected degree of stretch in the weft direction, where the degree of stretch or elongation can be from at least about 105% to no greater than about 130% (e.g., from about 115% to about 120%). Selection of the fiber content of elastic second yarns within the woven textile structure as well as the shapes of the cells formed (e.g., auxetic shapes, such as arrowhead shapes as depicted in FIGS. 4A and 4B) will affect the degree of stretch or elongation of the woven textile structure.

In a further embodiment, the woven textile structure can be subjected to heat treatment after its formation so as to shrink a width dimension of the structure (i.e., a dimension of the structure that is a cross dimension to the machine direction in which the woven textile structure is formed) to a specific or desired width (i.e., imparting controlled heat shrinkage to the structure). The width dimension of the woven textile structure can further be its weft direction (i.e., direction in which the span 210 of elastic second yarns run). Any suitable heating process and heating time can be applied to the woven textile structure to impart a controlled shrinkage in the width dimension so that the structure has a specific width. For example, when utilizing elastane fibers for the elastic second yarns and polyester fibers for the first yarns, heat treatment can be applied by moving a continuous length section of the woven textile structure over a heated section to subject the structure to temperatures within a suitable temperature range. This is useful for certain applications of the woven textile structure, such as forming an upper for an article of footwear.

Figure 7A:
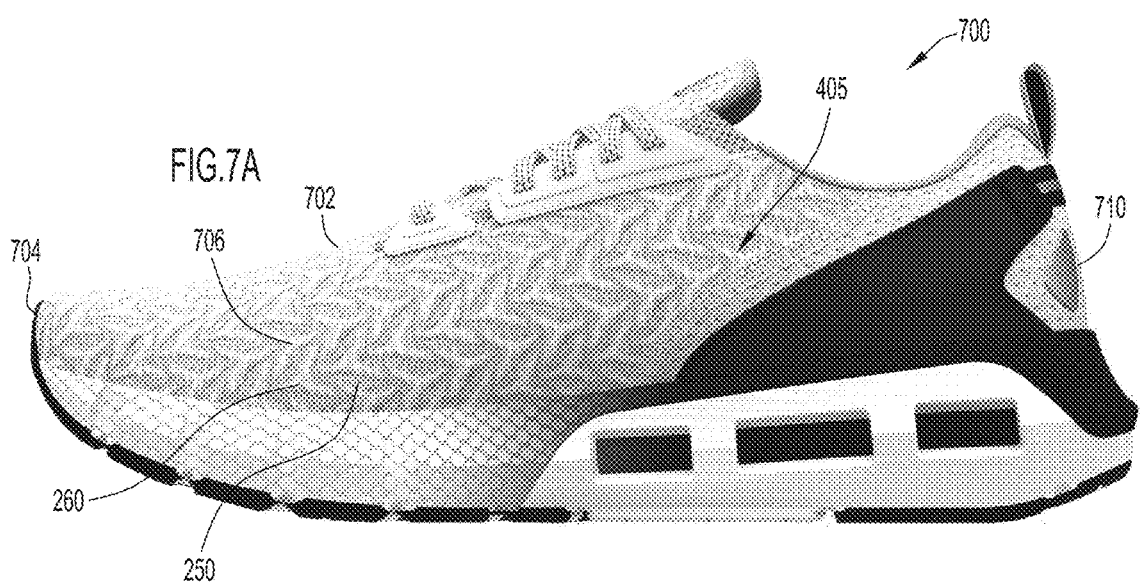
FIG. 7A is a medial side view of an article of footwear including an upper that incorporates the woven textile structure of FIG. 2B within the upper.
Figure 7B:
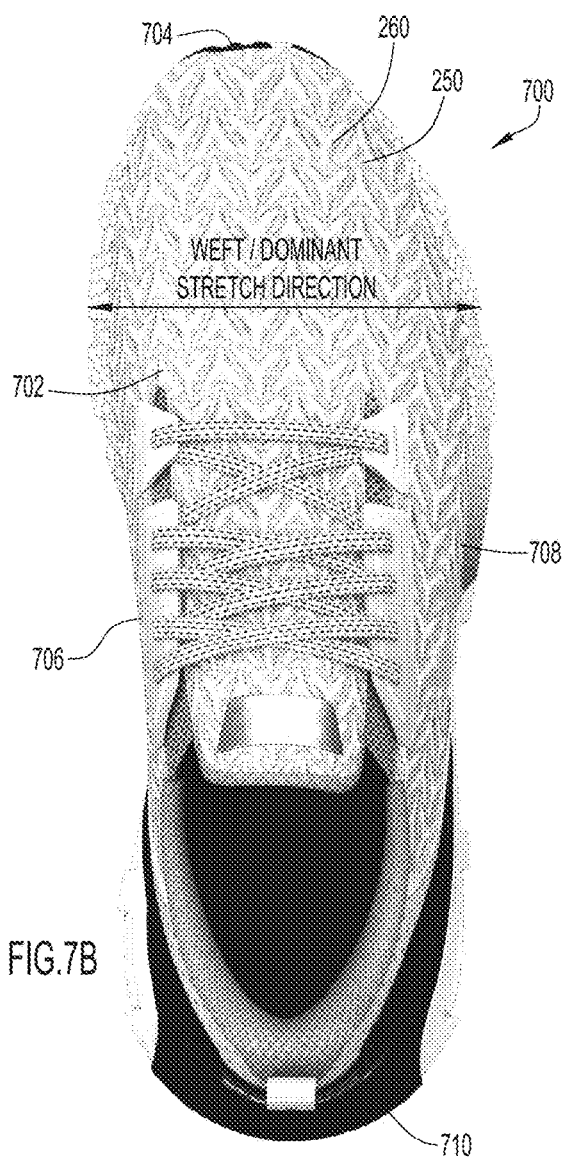
FIG. 7B is a top view in plan of the shoe of FIG. 7A.

An example embodiment of a textile product that incorporates the woven textile structure 200 is an upper for an article of footwear or shoe such as that shown in FIGS. 7A and 7B. In this embodiment, the cells 260 of the woven textile structure 200 have auxetic "arrowhead" shapes that are similar in shape to the pattern depicted in the stitch network 405 for the structure of FIG. 4A. The upper can be formed as a generally planar blank that is cut from a stock of the woven textile structure, where the cut-out forming the blank is shaped such that, when the blank is placed over a last or other upper forming structure during construction of the shoe, the blank forms some or all of the upper. As shown in FIGS. 7A and 7B, the woven textile structure forms a significant portion of the upper 702 for a shoe 700, including a front toe end 704, as well as a medial side 706 and a lateral side 708 of the shoe 700. In other embodiments, the woven textile structure can form the entirety of the upper 702, including a rear or heel end 710.

The composite textile structure 200 can be oriented in forming the upper 702 such that the weft direction of the structure, or direction in which the elastic second yarns of the span 210 extend, is in the widthwise or lateral-to-medial direction of the shoe 700. Further, the pattern or array of auxetic "arrowhead" shapes are oriented such that the pointed portions (and directions of the reentrant angles for the arrowhead shapes) of the cells 260 extend in a lengthwise or toe-to-heel direction of the shoe 700 and the upper 702. Selective expansion and/or contraction of the woven textile structure 200 is facilitated in at least the widthwise dimension of the upper 702, when the shoe 700 is worn as well as during various activities for the shoe when worn. In particular, the cells 260 can expand and contract (as previously described and as depicted, e.g., in FIGS. 6A and 6B) during wearing of the shoe 700, where full expansion and lock-out occurs when the cells 260 are substantially or entirely flattened (as shown in FIG. 6B). Full expansion and lock-out prevents further stretch or expansion of this portion of the upper 702. The woven textile structure can also be configured and dimensioned such that, when incorporated into an upper and the upper is secured to a sole structure (e.g., midsole and outsole) to form the shoe, the cells of the woven textile structure are slightly contracted due to a slight expansion of the structure in its weft direction. In this configuration, the woven textile structure can still be capable of further expansion until lockout is achieved.

Thus, a desired expansion and lockout of the upper at the portions defined by the woven textile structure 200 can be selected in any suitable direction of a shoe based upon orienting the auxetic shaped cells 260 in a particular direction along the upper. As previously noted, the woven textile structure 200 is oriented in its integration as a portion of the upper 702 such that the weft direction of the structure 200 extends between lateral and medial sides of the upper, thus achieving a substantial or dominant stretch in the lateral-to-medial direction (and vice versa) for the upper. In other embodiments, and depending upon a particular application, the woven textile structure 200 can be integrated with an upper such that its weft direction (direction of span 210 including the elastic second yarns) extends in the lengthwise or toe-to-heel dimension of the upper (thus imparting a dominant stretch in this direction for the shoe). Further embodiments can include two or more woven textile structures having their weft dimensions (i.e., span 210 of elastic second yarns) oriented in various directions of the shoe (toe-to-heel, lateral-to-medial sides, or any combinations thereof) so as to achieved desired expansion and lockout features in different directions of the shoe at specific locations and depending upon a particular purpose of use for the shoe.

The woven textile structure 200 can also be provided with one or any number of further layers coupled in any suitable manner with the structure. For example, a knit and/or mesh textile layer can be integrated at one side of the structure (i.e., to an exposed surface of the first woven layer or the second woven layer), where the knit and/or mesh textile layer can form an interior surface layer or interior lining of an upper for a shoe or for some other article of apparel (e.g., shirt, bra, pants, etc.).

In another example embodiment, at least one laminate polymer film or "skin" layer can be adhered (e.g., via a heat press method) to a surface of the woven textile layer that forms an outer surface of the upper for a shoe or an outer surface of any other article of apparel incorporating the woven textile structure. For example, a film or skin layer can be added to the exposed surface of the first woven layer 202 of the woven textile structure 200, where this exposed surface defines an exterior surface portion of an upper material used to form the upper of a shoe. The dimensions, including thickness, of the skin layer as well as the material(s) used to form the skin layer can be selected so as to have minimal or no impact on reducing the expansion and lockout features of the cells 260 of the structure 200. In example embodiments, the skin layer can be formed from a TPU material. Other polymer materials, such as other polyurethane and TPE (thermoplastic polyethylene) materials, can also be used to form a skin layer and/or used in combination with a TPU layer. The polymer skin layer (or layers) can be formed having an overall thickness that is in the range from about 0.25 mm to about 0.50 mm (e.g., about 0.35 mm in thickness). The skin layer can be provided (e.g., as an exterior surface skin for a shoe upper) to stiffen and reinforce the woven textile structure with little or no significant loss in expansion and/or auxetic properties of the overall structure.

Figure 8A:
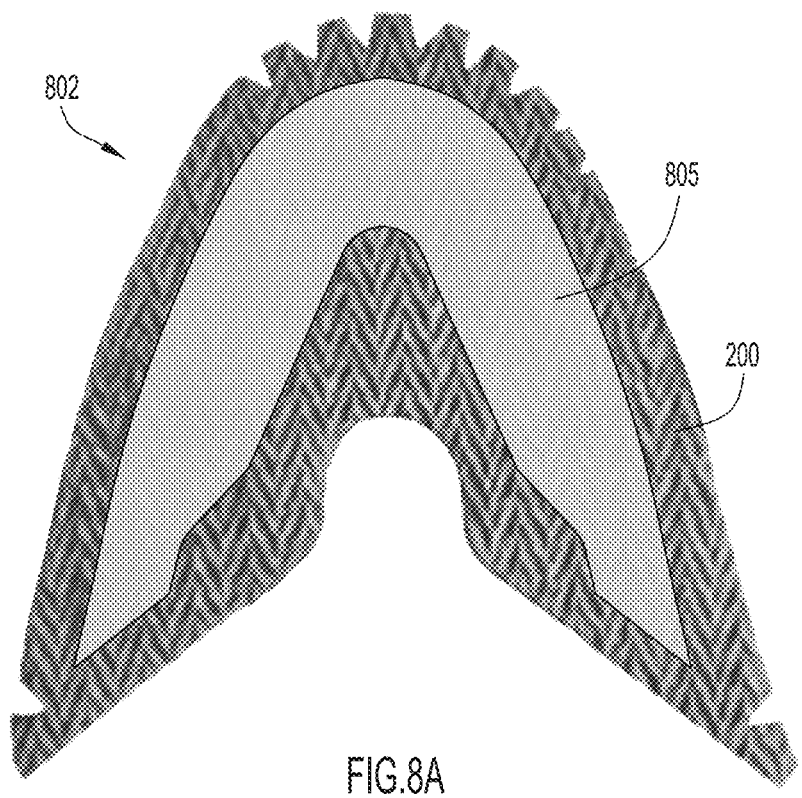
FIG. 8A is a top view of a blank for an upper including the woven textile structure with polymer film/skin layer to be applied and adhered to the blank via a vacuum thermoforming process as described herein.
Figure 8B:
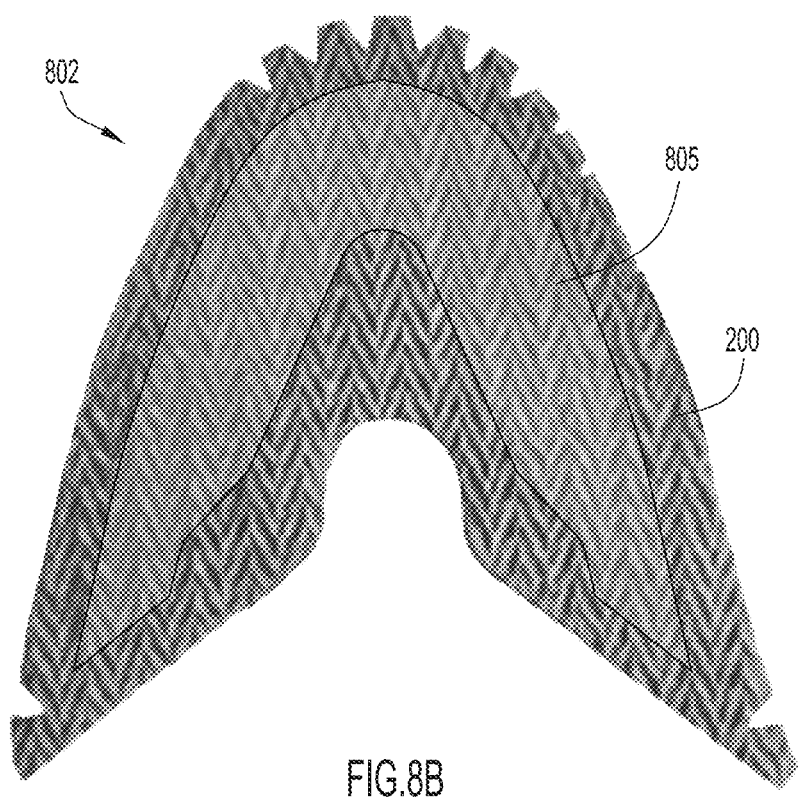
FIG. 8B is the top view of the blank of FIG. 8A after the vacuum thermoforming process in which the polymer film is adhered as a skin layer to the blank.

An example embodiment of method for applying a skin layer to a cut-out or blank of the woven textile structure 200 used to form a portion of an upper is now described with reference to FIGS. 8A and 8B. A vacuum thermoforming process can be used to apply a thin polymer layer comprising TPU to a surface of the woven textile structure 200 so as to form a TPU skin layer at the surface of the structure 200 (e.g., at an exposed surface of the first woven layer 202). In a specific example for forming an upper including an exterior TPU skin layer as shown in FIG. 8A, a blank 802 comprising the woven textile structure 200 is shaped in the form of a portion of an upper for a shoe, and a TPU layer 805 is placed over the blank 802. The blank 802 with TPU film 805 placed on top of the blank is subjected to a vacuum thermoforming process, in which the blank is heat treated by heating within vacuum forming plates at a suitable temperature and for a suitable time period so as to adhere the TPU film as a skin layer 805 over the blank as shown in FIG. 8B. The vacuum forming plates are configured to allow heated air to flow through the woven textile structure so as to heat and adhere the TPU film to the structure surface. In example embodiments utilizing TPU as the film and at a thickness from about 0.30 mm to about 0.50 mm, a suitable temperature is about 125° C. to about 145° C. (e.g., from about 130° C. to about 140° C.) for a time period of about 50 seconds or less (e.g., about 40 seconds).

The vacuum thermoforming process for adhering the TPU layer to the structure surface, so as to form the skin layer, does not significantly impact, affect or alter the dimensions or shapes of the cells or buckling of the first and second woven layers from each other. Thus, the composite structure (comprising woven textile layer with adhered TPU skin layer) maintains a visible pattern or array of cells along with their distinct shapes through the skin layer. As previously noted, the skin layer can further be configured so as to not impact or only slightly impact the stretch or elongation properties of the composite structure. For example, the composite structure can be formed so as to exhibit no greater than about a 5% reduction in degree of elongation along the weft direction of the woven textile structure (i.e., direction in which the span 210 of elastic second yarns extends).

The polymer skin layers can be formed over some or all of the exterior surface layer of the woven textile structure. The polymer skin layers can further be continuous or form discontinuous patterns along some or all of the exterior surface layer of the woven textile structure. Some non-limiting example embodiments of polymer skin layers for composite structures including the woven textile structure and polymer layer are depicted in FIGS. 9A and 9B.

Figure 9A:
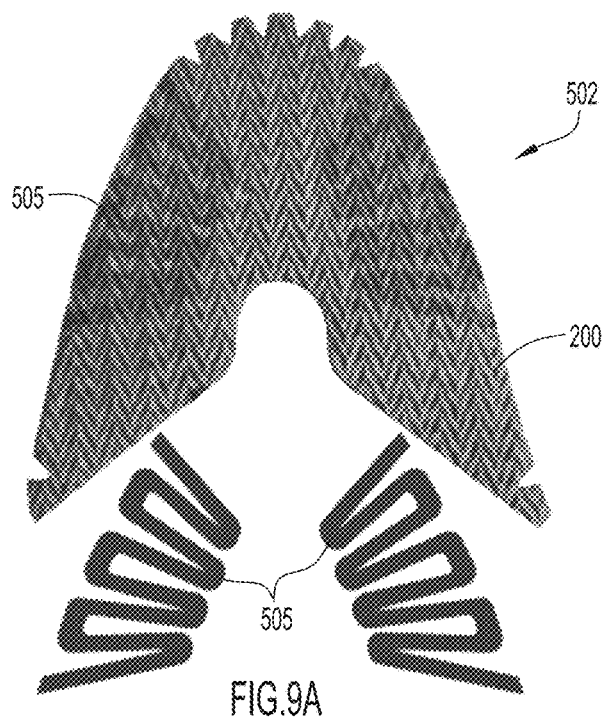
FIGS. 9A and 9B depict example embodiments of blanks for an upper including composite structures formed by adhering one or more polymer layers to the woven textile structure of FIG. 2B.

Referring to FIG. 9A, an example embodiment is depicted in which a blank 502 for an upper is formed including TPU skin layer 505 adhered to the exterior surface of the woven textile structure 200. The skin layer 505 includes a discontinuous pattern or a series of two serpentine shaped film layer structures that form TPU skin layers along the lateral and medial sides of the upper formed by the blank 505.

Figure 9B:
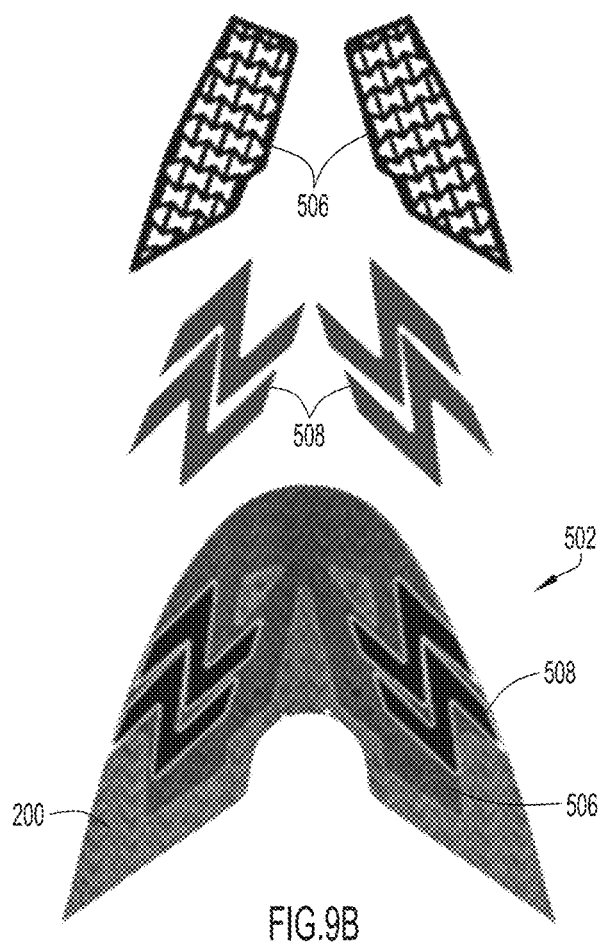

Referring to FIG. 9B, an embodiment is depicted in which a plurality of polymer layers is provided at the exterior surface of the blank 502 formed by the woven textile structure 200. In particular, the polymer layers include a pair of first or intermediate layers 506 that are first adhered to the exterior surface of the woven textile structure 200 via the vacuum thermoforming process as described herein. An additional pair of exterior polymer layers 508 are formed over the intermediate layers 506 via the same or similar vacuum thermoforming process as described herein. The first or intermediate polymer layer 506 can comprise TPE, while the second or exterior polymer layer 508 can comprise TPU. Further, to ensure that air can flow through the composite material to the exterior polymer layers 508, the intermediate layers 506 can comprise discontinuous materials having pores or openings through these layers 506. The openings through the intermediate layers 506 can also have auxetic shapes or any other suitable shapes. The blank 502 formed of the composite material, including woven textile structure 200 and two sets of polymer layers 506, 508 adhered to the structure 200, still substantially maintains is elongation and auxetic properties, with the shapes and dimensions of the cells 260 still being visible through the dual polymer layers 506, 508.

Utilizing the woven textile structure 200, with or without one or more polymer skin layers, provides features to an upper including durability and an improved fit over the user's foot, because the stretch of the upper can be adapted to the individual user's foot. In particular, each cell 260 of the woven textile structure 200 can be configured to stretch and/or collapse only as far as is needed for the given area of the foot. This expansion characteristic imparted to the upper by the woven textile structure applies not only when the user puts on the shoe, but also as he or she moves along a surface. The structure 200 is further dynamic, adjusting to load conditions as the user moves, but where the cells 260 never collapse beyond their lockout dimensions (i.e., the dimensions of the patterned stitching surrounding each cell). In particular, when the cells 260 are in a dynamic state, the cells are capable of collapsing when the composite material is stretched, and the cells are further capable of buckling or expanding in the "Z" direction from the central or intermediate span 210 of elastic second yarns when the stretch or tension on the woven textile structure 200 is released. The cells are further in a static state when the cells collapse to a lockout position (e.g., as depicted in FIG. 5B) in which further expansion of the woven textile structure is limited.

The above-described embodiments of the woven textile structure can also be used with or implemented in other types of articles of apparel or garments. For example, the woven textile structure can be implemented for use in a brassiere, an upper body garment (e.g., a shirt), a lower body garment (e.g., pants), or other types of clothing, such as the types depicted in FIGS. 10A-10C. In each embodiment, some or all of the garment incorporates the woven textile structure 200 as part of the garment.

Figure 10A:
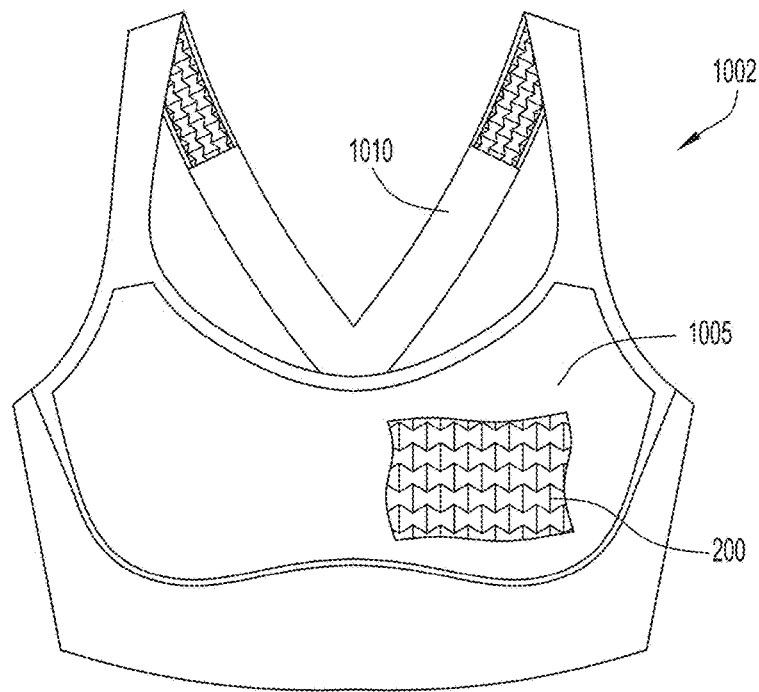
FIG. 10A shows a front view of a brassiere including a woven textile structure formed in accordance with embodiments described herein.

For example, referring to FIG. 10A, the woven textile structure 200 is incorporated into a portion (e.g., some or all) of a brassiere 1002. The brassiere 1002 includes cup portions or cup areas 1005 at the front of the brassiere that can incorporate the woven textile structure 200 to enhance stretching/flexure properties in the fabric material at those locations of the brassiere. The brassiere 1002 can also incorporate the woven textile structure 200 at any other location, such as along the back strap 1010 at the rear of the brassiere. The brassiere can further incorporate the woven textile structure along a substantial portion (e.g., 50% or more of the bra surface area) or even the entirety of the brassiere. The woven textile structure 200 can be implemented within the brassiere 1002 in any one or more desired orientations, as referenced by the warp and weft directions of the structure 200.

Figures 10B, 10C:
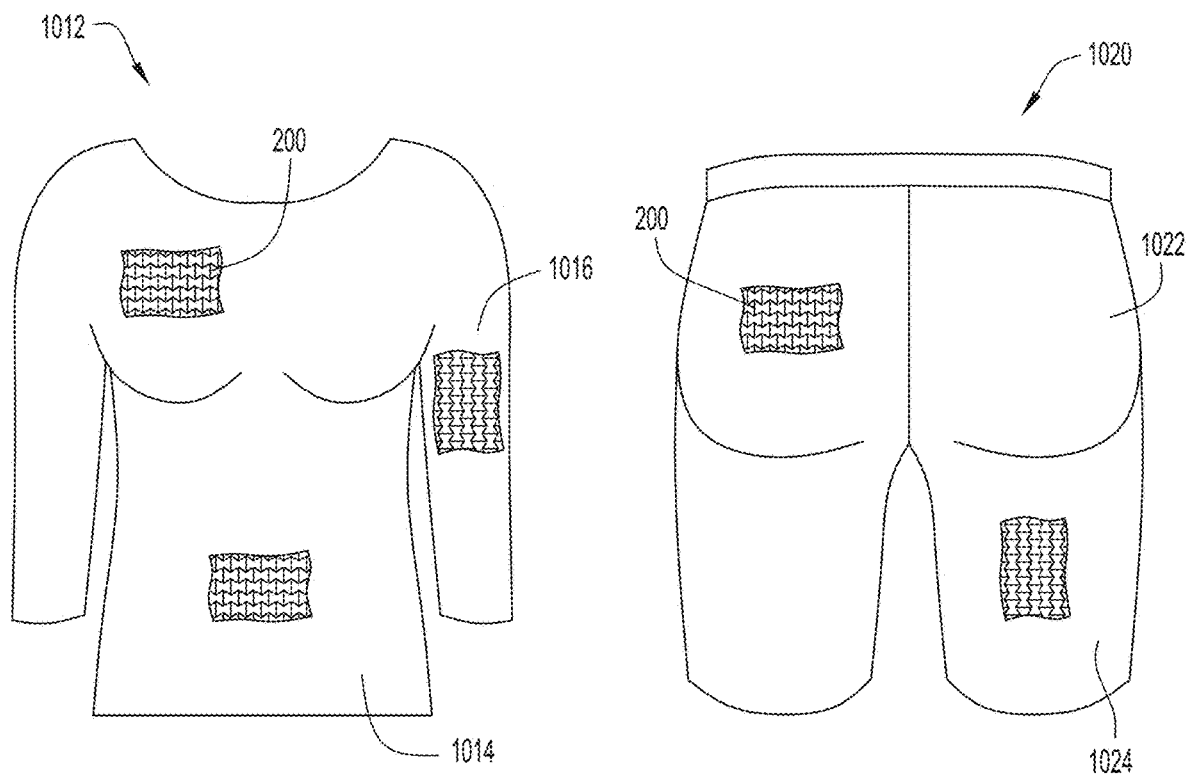
FIG. 10B is a view of an article of apparel (upper body garment or shirt) including a woven textile structure formed in accordance with embodiments described herein.
FIG. 10C is a view of an article of apparel (lower body garment or pants) including a woven textile structure formed in accordance with embodiments as described herein.

Referring to FIG. 10B, an article of apparel that implements the woven knit structure 200 is in the form of an upper body garment or shirt 1012 (e.g., an athletic shirt). The shirt 1012 includes a torso section 1014 (to fit around the torso of the wearer) and two arm sleeve sections 1016 (to fit around the arms of the wearer). The woven knit structure 200 can be implemented at any portion of the shirt. For example, the structure 200 can be incorporated as part (some or all) of the torso section 1012. In other embodiments, the woven knit structure can be used to form one or more portions of either arm sleeve section and/or the torso section. The woven knit structure can further form a substantial portion of the shirt (e.g., covering greater than 50% of the surface area of the shirt). Other portions of the shirt that may not include the woven knit structure and can be formed of any textile materials suitable for a shirt and formed via any suitable method and including any suitable one or more types of fibers or strands (e.g., elastic strands, non-elastic strands, polyester strands, nylon strands, etc.). The woven knit structure 200 integrated in the shirt 1012 can provide enhanced stretching, fit and comfort for the wearer.

In a further example embodiment depicted in FIG. 10C, an article of apparel that implements the woven knit structure 200 is in the form of lower body garment 1020 (e.g., leggings, pants or shorts). The lower body garment 1020 includes a main torso section 1022 that is configured to extend around the waist, hip and/or upper thigh regions of the wearer, and further two leg sleeve sections 1024 that extend from the main torso section 1022 and are configured to extend around some portion of the legs of the wearer. An elastic band can further be provided at an upper edge of the garment 1020 around the main torso section 1022. The woven knit structure 200 can be implemented at any portion of the lower body garment. For example, the woven knit structure 200 can be used to form one or more portions of either leg sleeve section and/or the main torso section. The woven knit structure 200 can further form a substantial portion of the lower body garment (e.g., covering greater than 50% of the surface area of the lower body garment).

Other embodiments incorporating a woven textile structure as described herein are also possible. For example, any textile material product can incorporate the woven textile structure as described herein to enhance the stretchable properties of the product. In further example embodiments, the woven textile structure as described herein could be integrated into an accessory that includes a pocket, such as a purse or a backpack.

Figure 11:
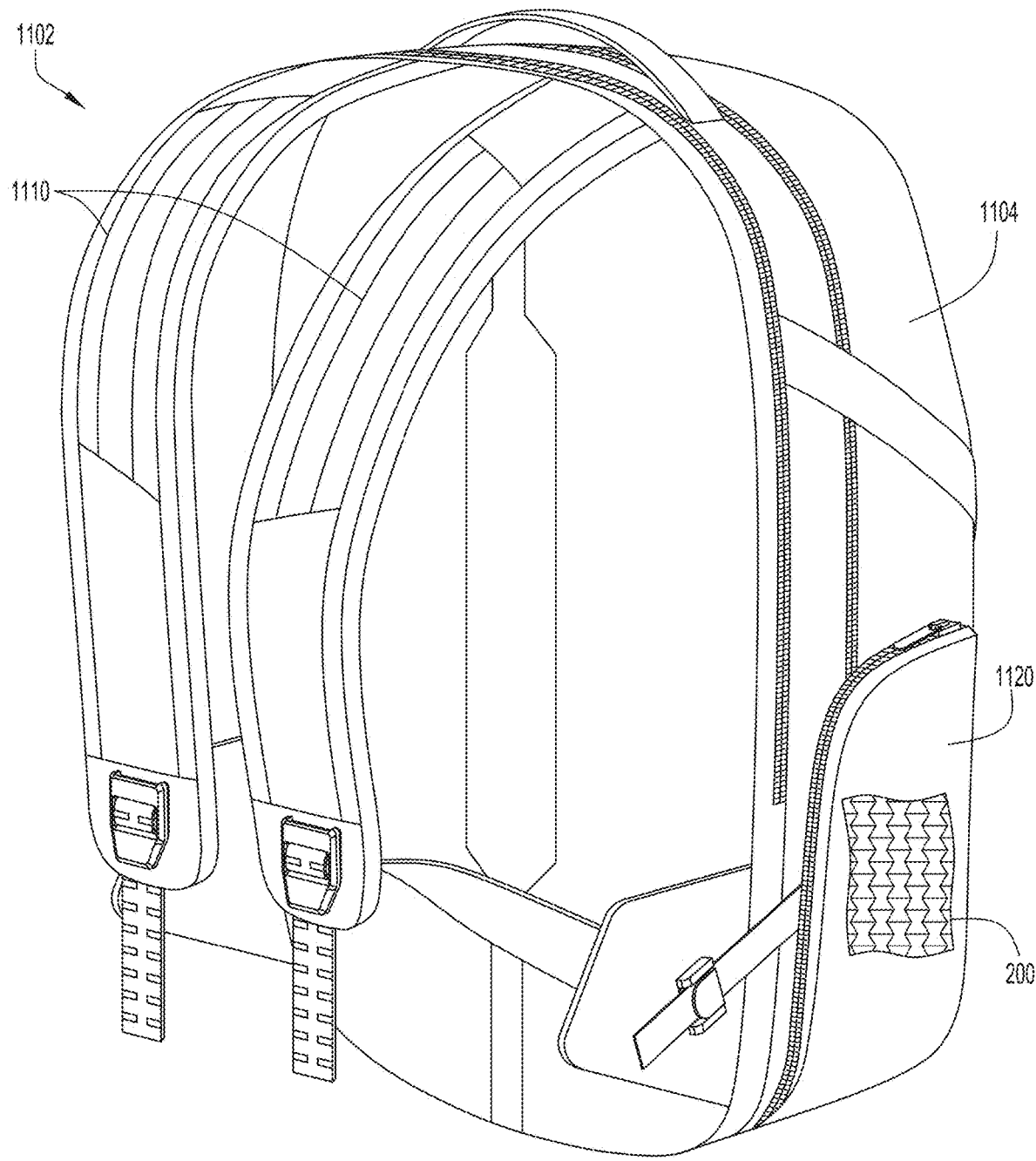
FIG. 11 is a view in perspective of an accessory with a pocket (a backpack) including a woven textile structure formed in accordance with embodiments as described herein.

Referring to FIG. 11, an example embodiment depicts a backpack 1102 comprising a main body or frame 1104 that is formed of one or more suitable materials and includes a front side, an opposing rear side and lateral sides extending between the front and rear sides. The backpack 1102 further includes shoulder straps 1110 that extend from the rear side of the main body 1104 that are suitably dimensioned and oriented to facilitate wearing of the backpack by a user by wrapping portions of the shoulder straps around the shoulders of the user so that the main body 1104 is aligned and in close proximity with the back of the user. The backpack can include one or more pockets disposed between front, rear and lateral sides of the main body 1104 as well as pockets disposed along exterior surface portions of any of the front, rear and lateral sides of the main body. For example, an exterior pocket 1120 can be provided along one or both of the lateral sides of the main body. The woven textile structure 200 can be incorporated with any fabric or other material structure of the backpack. For example, as depicted in FIG. 11, the woven textile structure 200 forms a portion of an exterior pocket 1120 of the backpack 1102 so as to enhance the stretch properties of the pocket. The woven textile structure can also be provided at any other locations and in any suitable orientations at a variety of locations along the backpack.

Figure 12:
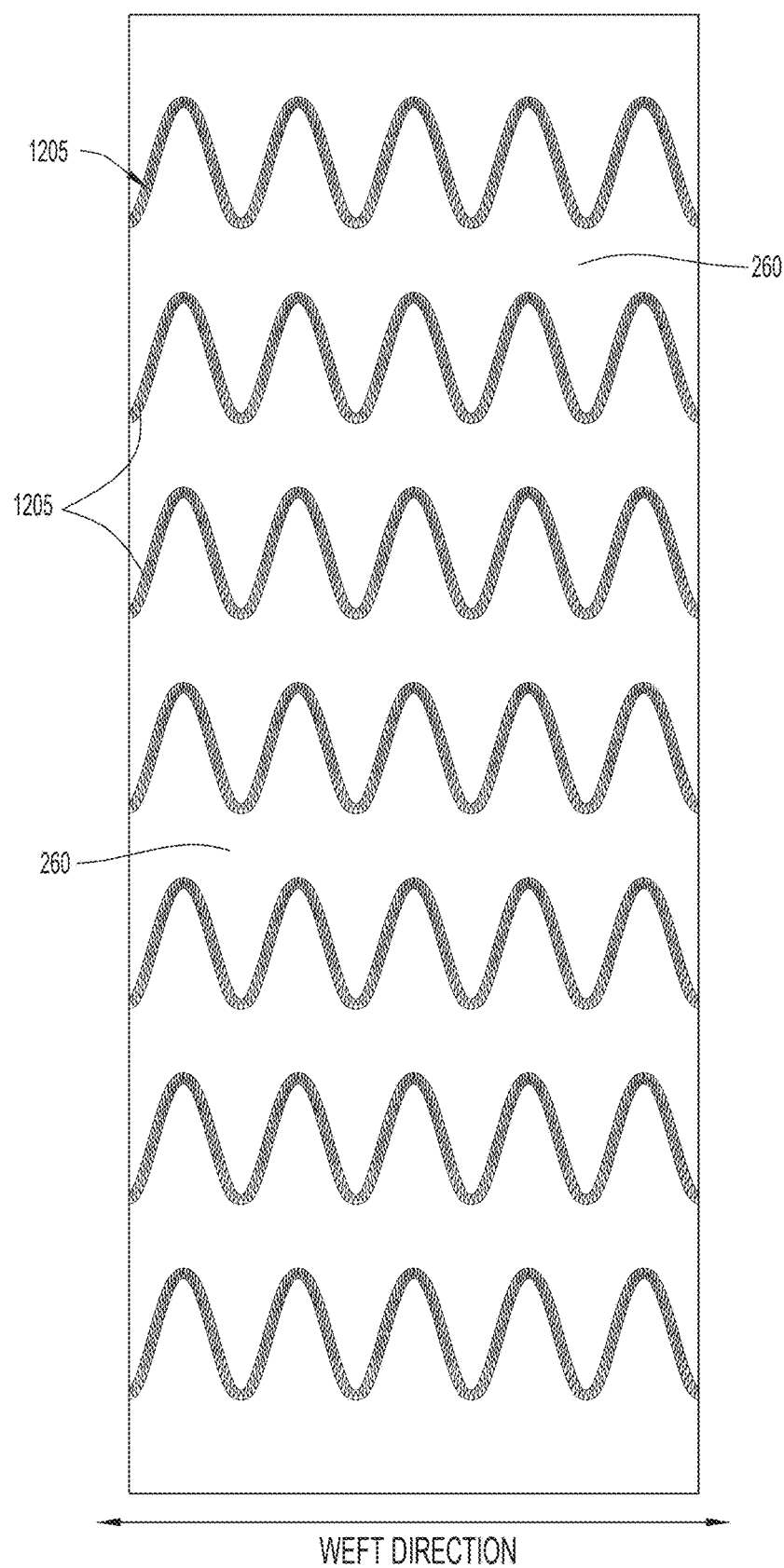
FIG. 12 depicts another embodiment of a woven textile structure including wavy stitch lines oriented and extending in the weft direction of the woven textile structure, where no closed cells are formed by the stitch lines.

In still further embodiments, a woven textile structure can be formed with stitch lines that do not form enclosed cells. For example, stitch lines can be formed that extend in the weft direction of the woven textile structure (e.g., along a portion or the entire length of the weft direction for the woven textile structure). In a specific example depicted in FIG. 12, rows of stitch lines 1205, each having a wavy or other selected pattern, can extend generally parallel (i.e., do not intersect) with and at selected distances from each other along the weft direction. Even without the enclosed cells, the combination of relaxation/contraction and the formed stitches 1205 results in a buckling or bowing of portions of each of the first and second woven layers away from each other between the stitches (i.e., between the anchor point locations at which yarns of the first and second woven layers and intermediate span are interlaced and locked with each other). The stitch lines provided in this manner provide the resultant woven textile structure with a negative Poisson's ratio. For example, the stitch lines can impart auxetic properties to the woven textile structure.

While the invention has been described in detail and with reference to specific embodiments thereof, it will be apparent to one skilled in the art that various changes and modifications can be made therein without departing from the spirit and scope thereof.

For example, while the example embodiments depicted in the figures show an article of footwear (shoe) configured for a right foot, it is noted that the same or similar features can also be provided for an article of footwear (shoe) configured for a left foot (where such features of the left footed shoe are reflection or "mirror image" symmetrical in relation to the right footed shoe).

The woven textile structure can be implemented in any textile article to enhance stretchability of the article at one or more locations independent of other locations of the article. Any number of additional layers (e.g., lining layers, skin layers, etc.) can be adhered to the woven textile structure without any significant impact on the stretch/elongation properties as well as the recovery properties of the woven textile structure.

The stitch network 405 used to form cells of the woven textile structure can be formed via interlacing of any suitable number of first yarns from the first and second woven layers as well as any suitable number of elastic second yarns of the weft oriented intermediate span. The cells formed by the stitch network along surfaces of the woven layers can have any suitable shapes depending upon a particular application for the composite material. In particular, while auxetic shapes can be useful for certain applications, other enclosed shapes for the cells formed by the stitch network are also possible (e.g., enclosed circles or enclosed oval patterns, intersecting wavy line patterns, etc.). Further, the stitch lines can form any other suitable patterns that do not define enclosed cells.

The stitch network 405 along the woven textile structure can also include enclosed cells having different shapes and/or different sizes at different areas of the woven textile structure. For example, a stitch network can be provided along a woven textile structure used to form an article of apparel (e.g., an upper of a shoe) that includes a first pattern of cells having a first shape (e.g., arrowhead auxetic shapes) at a first area of the woven textile structure and a second pattern of cells have a second shape (e.g., hourglass auxetic shapes) at a second area of the woven textile structure. Further, any number of woven textile structures (one or more) having the same or different shapes and/or patterns of cells can be combined to form some or all of an article of apparel.

Accordingly, in example embodiments, a method of forming a woven textile structure comprises weaving a first woven layer comprising first yarns arranged in a warp direction and a weft direction of the woven textile structure. During the weaving of the first woven layer, weaving a second woven layer comprising first yarns arranged in the warp direction and the weft direction of the woven textile structure, where the first and second woven layers are arranged in a stacked manner and are separated from each other. During the weaving of the first and second woven layers, inserting a plurality of second yarns along an intermediate span in the weft direction of the woven textile structure, where the second yarns have a degree of elongation that is greater than the first yarns, the intermediate span is located in between the first and second woven layers, and the second yarns are elongated to an elongated length during the insertion in the weft direction. First yarns of the first woven layer are interlaced with first yarns of the second woven layer and also with one or more second yarns of the intermediate span at a plurality of interlacing locations along the woven textile structure so as to define stitches at each interlacing location, where each stitch joins the first woven layer with the second woven layer, each second yarn contracts from the elongated length to a relaxed length after insertion in the weft direction and interlacing with first yarns of the first and second woven layers.

The interlacing can further comprise forming stitches along stitch lines so as to define a network of enclosed cells bounded by the stitch lines, where each cell comprises a first portion of the first woven layer that is buckled away from the intermediate span and a second portion of the second woven layer that is buckled away from the intermediate span and in an opposing direction from the first portion.

Elongation of the woven textile structure along the weft direction can cause movement of the first portion of the first woven layer toward the second portion of the second woven layer of each cell so as to change a void volume defined between the first and second woven layers of each cell.

The stitches can be formed along stitch lines extending in the weft direction of the woven textile structure so as to impart a negative Poisson's ratio to the woven textile structure. The stitch lines extending in the weft direction of the textile structure can impart auxetic properties to the woven textile structure.

The forming of stitches along stitch lines can form enclosed cells of the network having auxetic shapes. The auxetic shape of each cell can be defined by at least two stitch lines forming a reentrant angle, and the reentrant angle can be oriented in the weft direction of the woven textile structure.

A polymer layer can be applied to an exterior surface of the first woven layer. The polymer layer can be applied to the exterior surface of the first woven layer via a vacuum thermoforming process to the first woven layer at a temperature ranging from about 125° C. to about 145° C. In addition, the polymer layer can have a thickness from about 0.30 mm to about 0.50 mm.

The woven textile structure can be integrated into an article of apparel. The article of apparel can be selected from the group consisting of an upper for an article of footwear, a brassiere, an upper body garment, and a lower body garment. The article of apparel can comprise an upper for an article of footwear, and the weft direction of the woven textile structure can be oriented in a width dimension of the upper such that the second yarns of the intermediate span of the woven textile structure extend transverse a toe-to-heel dimension of the upper.

The woven textile structure can be integrated into an accessory including a pocket. The accessory can comprise a backpack.

In another embodiment, a method of forming a woven textile structure can comprise weaving a first woven layer comprising first yarns arranged in a warp direction and a weft direction of the woven textile structure, weaving a second woven layer comprising first yarns arranged in the warp direction and the weft direction of the woven textile structure, and combining a plurality of second yarns with first yarns of the first and second woven layers such that the second yarns are disposed between the first and second woven layers and form an intermediate span in the weft direction of the woven textile structure, where the second yarns have a degree of elongation that is greater than the first yarns. The combining second yarns with first yarns can form a network of enclosed cells along the woven textile structure, each cell comprising a first portion of the first woven layer that is buckled away from the intermediate span and a second portion of the second woven layer that is buckled away from the intermediate span and in an opposing direction from the first portion.

The cells of the network can have auxetic shapes.

The method can further comprise integrating the woven textile structure into an article of apparel. The article of apparel can be selected from the group consisting of an upper for an article of footwear, a brassiere, an upper body garment, and a lower body garment. The article of apparel can also comprise an upper for an article of footwear, where the weft direction of the woven textile structure is oriented in a width dimension of the upper such that the second yarns of the intermediate span of the woven textile structure extend transverse a toe-to-heel dimension of the upper.

In other example embodiments, an article of footwear can comprise a sole structure, and an upper coupled to the sole structure, the upper comprising a dynamic textile structure capable of expansion and contraction. The textile structure can include a first textile layer, a second textile layer, and a support framework comprising a plurality of anchor strands possessing stretch and recovery, where each of the first textile layer and the second textile layer is coupled to an anchor strand of the plurality of anchor strands at an anchor point.

Each of the first textile layer and the second textile layer can be a woven textile, where the first textile layer defines a warp direction and a weft direction, the second textile layer defines a warp direction and a weft direction, and, within the dynamic textile structure, the warp direction and weft direction of the first layer is in registry with the warp direction and the weft direction of the second layer.

The plurality of anchor strands can possesses a first stretch value; the first textile layer can comprise strands possessing a second stretch value, and the second textile layer can comprise strands possessing a third stretch value, the first stretch value being greater than each of the second and third stretch values.

Each of the first textile layer and the second textile layer can be coupled to the plurality of anchor strands at a plurality of anchor points.

The plurality of anchor points can be organized in a manner effective to control an expansion pattern of the dynamic textile structure.

The plurality of anchor points can be organized to form an array of closed cells in the dynamic textile structure. The array of closed cells can be effective to affect the Poisson's ratio of the dynamic textile structure as it expands.

The first textile layer can be a woven textile comprising strands organized in wefts and warps, the second textile layer can be a woven textile comprising strands organized in wefts and warps, and strands from each the first textile layer and the second textile layer can be interlaced with the anchor strand at the anchor point, thereby forming a stitch.

The dynamic textile structure can includes a plurality of anchor points, and strands from each the first textile layer and the second textile layer can be interlaced with an anchor strand of the plurality of anchor strands at each anchor point of the plurality of anchor points, thereby forming a plurality of stitches. The plurality of stitches can be arranged to form a plurality of cells within the dynamic textile structure, each cell of the plurality of cells comprising a stitch boundary surrounding a central web possessing a first textile layer side and a second textile layer side.

The dynamic textile structure can define a warp direction and a weft direction, where the dynamic textile structure is reconfigurable from a normal, unstretched configuration to a stretched configuration by applying tension along the warp direction or the weft direction of the dynamic textile structure, and, in the unstretched position the web portion of a cell on the first textile layer side can buckle to form a protrusion in the first textile layer. In the normal position, the web portion of the cell on the second textile layer side can buckle to form a protrusion in the second textile layer. Further, in the stretched position the first textile layer protrusion and the second textile layer protrusion can flatten.

Each cell of the plurality of cells can possess a reentrant shape. In addition, each of cells can cooperate to provide the dynamic textile material with a negative Poisson's ratio. The first textile layer can define a warp direction and a weft direction, the second textile layer can define a warp direction and a weft direction, and, within the dynamic textile structure, the warp direction and weft direction of the first textile layer can be in registry with the warp direction and the weft direction of the second textile layer such that the dynamic textile structure defines a warp direction and a weft direction. The framework can be oriented such that the plurality of anchor strands extends along the weft direction of the dynamic textile structure. Further, the upper can define an interior and exterior, the first textile layer can form the exterior of the upper, and the second textile layer can form the interior of the upper.

It is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

What is claimed:

1. An article of footwear comprising:
   a sole structure; and
   an upper coupled to the sole structure, the upper comprising a dynamic textile structure capable of expansion and contraction, the textile structure including:
      a first woven textile layer comprising yarns arranged in a warp direction and yarns arranged in a weft direction of the dynamic textile structure,
      a second woven textile layer comprising yarns arranged in the warp direction and yarns arranged in the weft direction of the dynamic textile structure, and
      a support framework disposed between the first woven textile layer and the second woven textile layer and consisting of a plurality of anchor strands possessing stretch and recovery, wherein each anchor strand is separated from every other anchor strand, all of the anchor strands extend in a same direction, the same direction being the weft direction of the textile structure, and at least some of the warp and weft yarns of each of the first woven textile layer and the second woven textile layer interlace with each other and with each anchor strand of the plurality of anchor strands at a plurality of anchor points;
   wherein:
      the anchor strands possess a first stretch value;
      the first woven textile layer comprises yarns possessing a second stretch value;
      the second woven textile layer comprises yarns possessing a third stretch value, the first stretch value being greater than each of the second and the third stretch values; and
      the dynamic textile structure is oriented along the upper in which the anchor strands and the weft direction are aligned in a direction transverse a lengthwise dimension of the article of footwear such that a greatest degree of elongation of the dynamic textile structure is oriented in the direction transverse the lengthwise dimension of the article of footwear.

2. The article of footwear according to claim 1, wherein the anchor points are organized in a manner effective to control an expansion pattern of the dynamic textile structure.

3. The article of footwear according to claim 2, wherein the anchor points are organized to form an array of closed cells in the dynamic textile structure.

4. The article of footwear of claim 3, wherein the array of closed cells is effective to affect a Poisson's ratio of the dynamic textile structure as the dynamic textile structure expands.

5. The article of footwear of claim 1, wherein yarns from each of the first woven textile layer and the second woven textile layer are interlaced with an anchor strand of the plurality of anchor strands at each anchor point of the plurality of anchor points, thereby forming a plurality of stitches.

6. The article of footwear of claim 5, wherein the stitches are arranged to form a plurality of cells within the dynamic textile structure, each cell of the plurality of cells comprising a stitch boundary surrounding a web portion that includes portions of the first woven textile layer and the second woven textile layer.

7. The article of footwear of claim 6, wherein:
the dynamic textile structure is reconfigurable from a normal, unstretched configuration to a stretched configuration by applying tension along the warp direction or the weft direction of the dynamic textile structure; and
in the unstretched configuration for each cell, a first portion of the first woven textile layer within the web portion of each cell extends in a first direction away from the anchor strands.

8. The article of footwear of claim 7, wherein, in the unstretched configuration, a second portion of the second woven textile layer within the web portion of each cell extends in a second direction away from the anchor strands, the second direction opposing the first direction.

9. The article of footwear of claim 8, wherein, in the stretched configuration, each cell flattens such that a first distance in the first direction of the first portion of the first woven textile layer is decreased and a second distance in the second direction of the second portion of the second woven textile layer is decreased.

10. The article of footwear according to claim 6, wherein each cell of the plurality of cells possesses a reentrant shape.

11. The article of footwear according to claim 10, wherein the plurality of cells cooperates to provide the dynamic textile structure with a negative Poisson's ratio.

12. The article of footwear according to claim 1, wherein:
the upper defines an interior and exterior;
the first woven textile layer forms the exterior of the upper; and
the second woven textile layer forms the interior of the upper.

13. The article of footwear of claim 1, further comprising a polymer laminate layer applied to at least an exterior surface portion of the first woven textile layer.

14. The article of footwear of claim 13, wherein the polymer laminate layer has a thickness from about 0.25 mm to about 0.50 mm.

* * * * *